United States Patent [19]
Hamano et al.

[11] Patent Number: 5,074,631
[45] Date of Patent: Dec. 24, 1991

[54] OPTICAL MODULATOR

[75] Inventors: Hiroshi Hamano, Kawasaki; Izumi Amemiya, Yokohama; Hiroshi Nishimoto, Sagamihara; Takefumi Namiki, Ebina; Izumi Yokota, Kawasaki; Tadashi Okiyama, Yokohama; Minoru Seino, Atsugi, all of Japan

[73] Assignee: Fujitsu Limited, Kawasaki, Japan

[21] Appl. No.: 492,129

[22] Filed: Mar. 13, 1990

[30] Foreign Application Priority Data

Mar. 14, 1989 [JP] Japan ................................. 1-059617
Mar. 14, 1989 [JP] Japan ................................. 1-061534

[51] Int. Cl.$^5$ .............................................. G02F 1/21
[52] U.S. Cl. ...................................................... 385/3
[58] Field of Search .............. 350/96.13, 96.14, 96.15, 350/96.16

[56] References Cited

U.S. PATENT DOCUMENTS

| | | | |
|---|---|---|---|
| 4,288,785 | 9/1981 | Papuchon et al. | 350/96.14 X |
| 4,679,893 | 7/1987 | Ramer | 350/96.14 |
| 4,683,448 | 7/1987 | Duchet et al. | 350/96.14 X |
| 4,758,060 | 7/1988 | Jaeger et al. | 350/96.11 |
| 4,820,009 | 4/1989 | Thaniyavarn | 350/96.13 |
| 4,936,644 | 6/1990 | Raskin et al. | 350/96.14 |
| 4,936,645 | 6/1990 | Yoon et al. | 350/96.14 |

FOREIGN PATENT DOCUMENTS

WO88/03278 5/1988 United Kingdom.

OTHER PUBLICATIONS

Journal of Lightwave Technology, vol. 6, No. 1, Jan. 1988, IEEE, "Frequency Chirping in Exterual Modulators", by F. Koyama et al., pp. 87-93.
Optics Letters, vol. 5, No. 7, Jul. 1980, *Optical Society of America*, "High-Speed Operation of LiNbO3 Electro-Optic Interferometric Waveguide Modulators", by F. J. Leonberger, pp. 312-314.

*Primary Examiner*—John D. Lee
*Attorney, Agent, or Firm*—Staas & Halsey

[57] ABSTRACT

A Mach-Zehnder interferometer type modulator, constructed of first and second optical waveguides, first and second electrodes cooperating with the same, and a driving voltage source, wherein a driving voltage source is constructed of first and second driving units which drive independently the first and second electrodes in accordance with a data input and wherein the first and second driving units apply first and second driving voltages, individually determined, to the first and second electrodes.

23 Claims, 27 Drawing Sheets

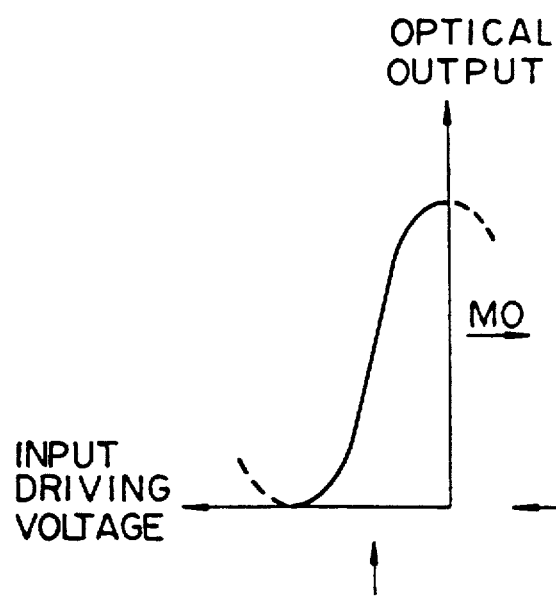
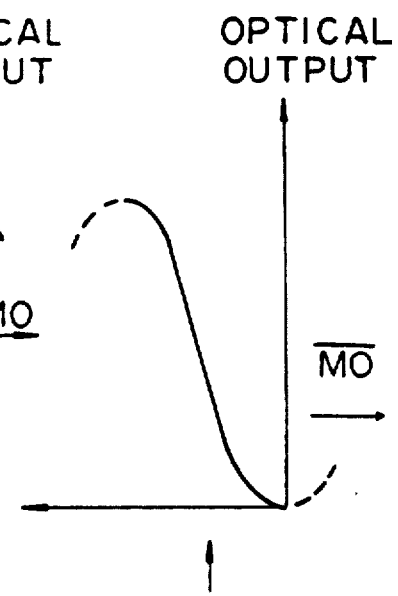
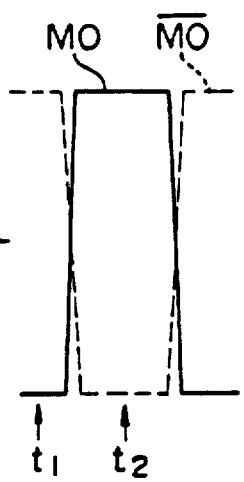
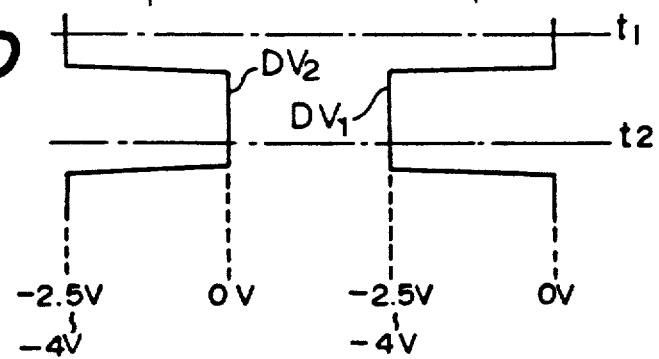

Fig. 17A DATA INPUT Din
Fig. 17B LIGHT PHASE $\phi_A$ (IN OPTICAL WAVEGUIDE 41)
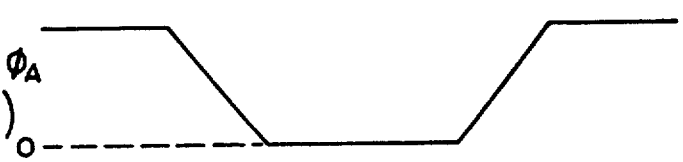
Fig. 17C LIGHT PHASE $\phi_B$ (IN OPTICAL WAVEGUIDE 42)
Fig. 17D PHASE DIFFERENCE $|\phi_B - \phi_A|$
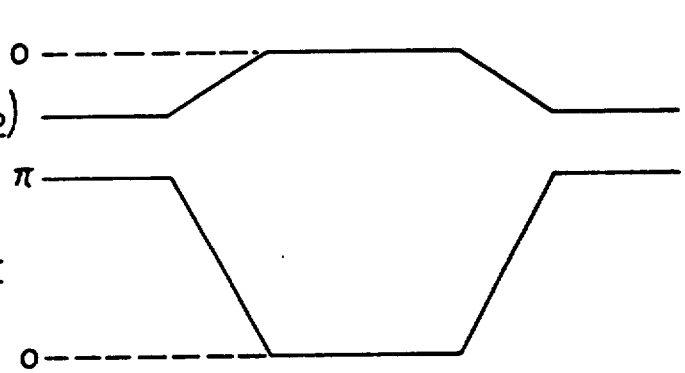
Fig. 17E MODULATED LIGHT INTENSITY $|E_{out}|$
Fig. 17F MODULATED LIGHT PHASE
Fig. 17G CENTER WAVELENGTH OF MODULATED LIGHT $\lambda_0$
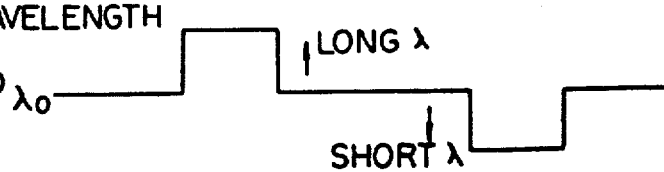

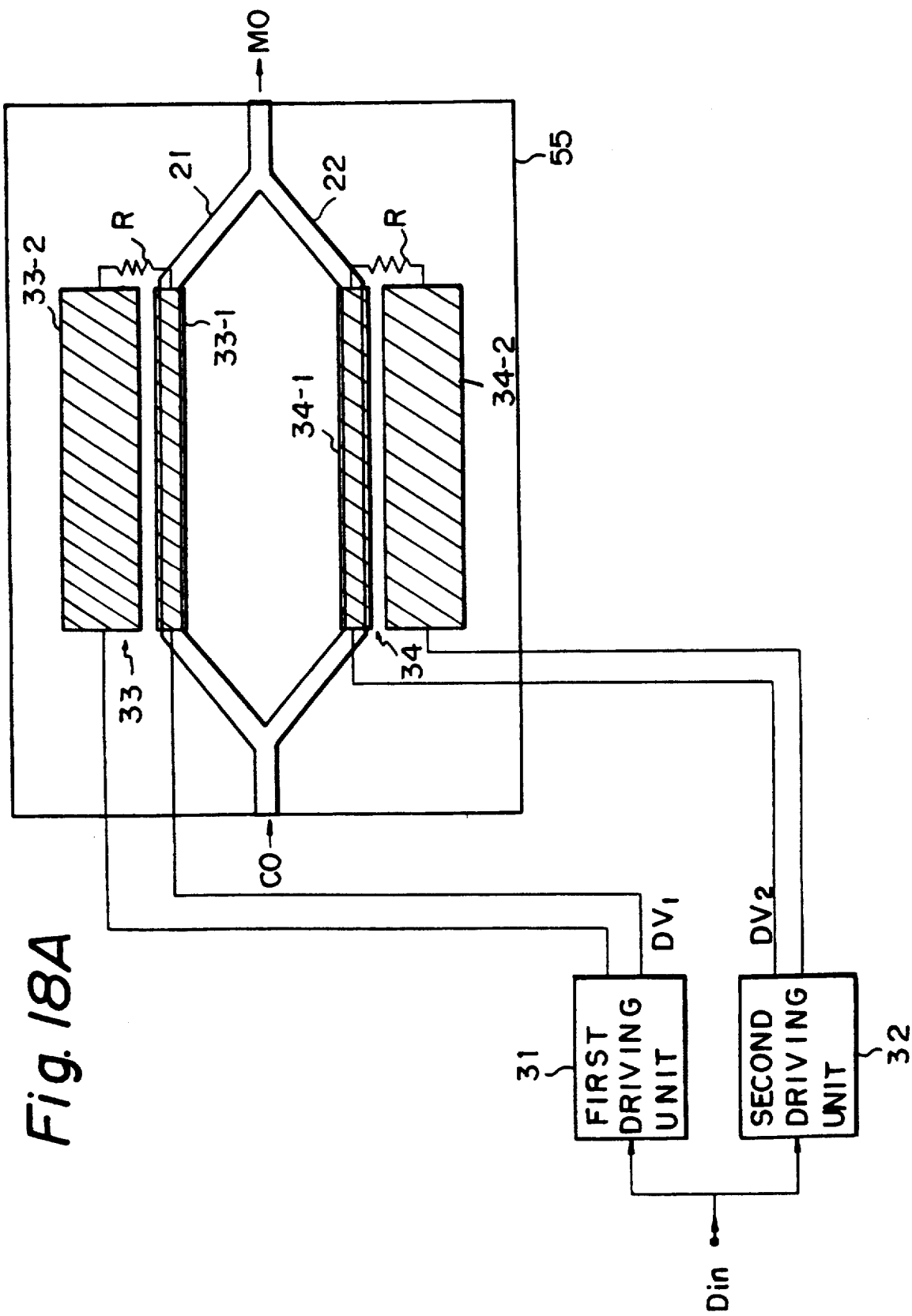

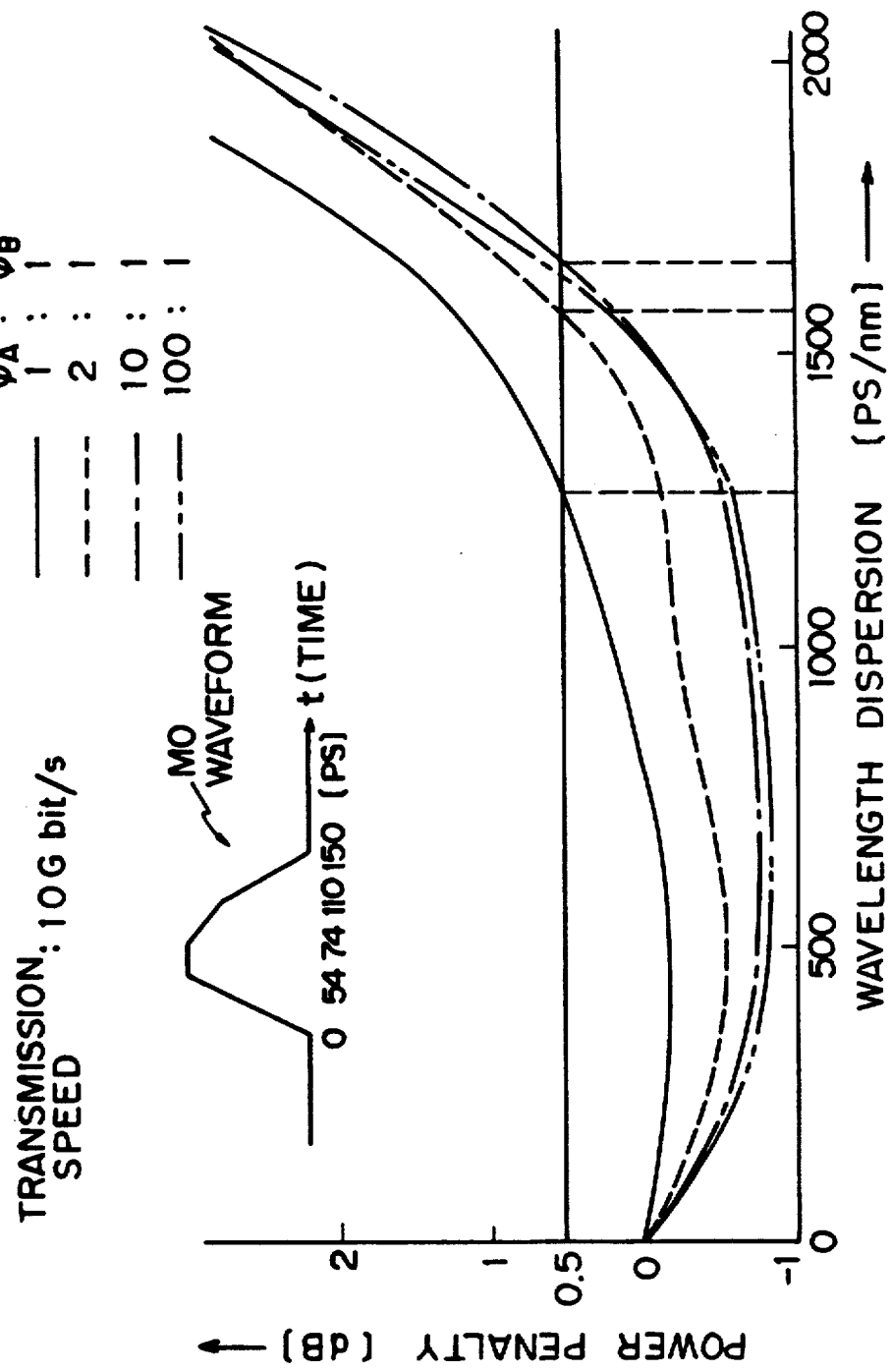

OPTICAL MODULATOR

BACKGROUND OF THE INVENTION

1. Field of the Invention

The present invention relates to an optical modulator used in a transmission apparatus for transmitting high speed digital signals in an optical communication system using optical fibers as a transmission channel.

In recent years, optical communication systems using optical signals as the medium of communication have rapidly been put into use. The optical modulators for producing the optical signals in the optical communication systems are extremely important devices. The present invention refers to such optical modulators, in particular external modulation type optical modulators.

2. Description of the Related Art

In the conventional direct modulation type optical modulators, when the modulation speed became large, so-called frequency chirping occurred, resulting in deterioration of the high speed characteristics. Frequency chirping is the shift in the wavelength of the light during the rise and fall of the light signal with each such rise and fall. Frequency chirping causes waveform deterioration in the light signal received in the receiving system through the optical fiber due to optical fiber wavelength dispersion. Therefore, in a high speed optical communication system wherein a high speed light modulation of several Gbps is required, it is not possible to use a direct modulation type optical modulator.

One known type of external modulation type optical modulator is a Mach-Zehnder interferometer type modulator, which will be explained later. Such a Mach-Zehnder interferometer type modulator has the smallest spread of the spectrum and therefore is able to avoid the waveform deterioration at the receiver caused by the effects of wavelength dispersion of the fiber. That is, in such a Mach-Zehnder interferometer type modulator, the phases of the light propagating through two optical waveguides are modulated in opposite directions by the same magnitude for modulation free from frequency chirping and it is thus possible to reduce the spectral spread to the spread of the modulation side band, by the Fourier component of the modulation waveform. Note that a known reference relating to an optical modulator of this type is F. Koyama et. al., JOURNAL OF LIGHTWAVE TECHNOLOGY, vol. 6, No. 1, Jan. 1988, IEEE, pp. 87 to 93.

There are, however, the following problems in the conventional Mach-Zehnder interferometer type modulator.

First, while there is a desire to make the modulation driving circuit of the optical modulator by a semiconductor integrated circuit (IC) and thus reduce the size, it is not easy to make the modulation driving circuit by an IC chip. The reason is that the conventional Mach-Zehnder interferometer type modulator requires a high voltage of −5 V to −8 V and it is difficult to manufacture an IC able to withstand such a high voltage.

Second, while there is a desire to reduce the offset of the optical modulator as much as possible, it is not easy to reduce the offset. Here, "offset" means the offset in the modulation driving voltage and deviation in various characteristics accompanying temperature fluctuations.

Third, it is not possible to use an optical modulator for a long distance optical communication system operating at a high transmission speed of over several Gbps. This is due to the so-called wavelength dispersion in the optical fibers. That is, it has not been possible to meet the demand for constructing a high speed, long distance optical communication system using such general optical fibers producing large wavelength dispersions.

SUMMARY OF THE INVENTION

Therefore, the present invention has as its object the provision of an optical modulator which is able to satisfy each of the first to third desires mentioned above when so demanded by the designer of the optical communication system.

To achieve the above object, the optical modulator of the present invention is constituted as follows. The present invention is based on a known Mach-Zehnder interferometer type modulator. Such a Mach-Zehnder interferometer type modulator is generally constructed of a first optical waveguide and second optical waveguide which split continuous light from a light source and receive the same at their input terminals, a pair of electrodes which are formed on the first and second optical waveguides, and a driving circuit which applies a driving signal for optical modulation to the pair of electrodes, modulated light being transmitted from the output terminals of the first and second optical waveguides.

The present invention is characterized in construction in that, first, it has, independently, a first driving unit which drives a first electrode cooperating with the first optical waveguide and a second driving unit which drives a second electrode cooperating with the second optical waveguide and second, the first driving voltage and second driving voltage applied to the first and second electrodes from the first and second driving units are determined independently from each other.

BRIEF DESCRIPTION OF THE DRAWINGS

The above object and features of the present invention will be more apparent from the following description of the preferred embodiments with reference to the accompanying drawings, wherein:

FIG. 10 is a graph for explaining the operation of the first embodiment of the present invention;

FIG. 17 is a waveform diagram used for explaining FIG. 16;

FIG. 18A is a view of the construction of a second embodiment of the present invention;

FIG. 28 is a graph of the results of a second calculation for explaining the improvement in the transmission characteristics of optical fibers according to the present invention.

DESCRIPTION OF THE PREFERRED EMBODIMENTS

Before describing the embodiment of the present invention, the related art and the disadvantages therein will be described with reference to the related figures.

Figure 1:
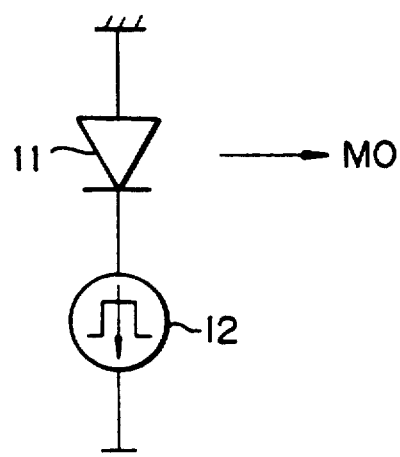
FIG. 1 is a view schematically showing a first aspect of an optical modulator.

FIG. 1 is a view of a first aspect of the optical modulator, which belongs to what are known as direct modulation type modulators. In the figure, reference numeral 11 is a light source, for example, a laser diode (LD), which is connected in series to a driving signal source 12. The optical modulator shown here applies direct modulation to the laser diode 11 to obtain modulated light MO.

In a direct modulation type optical modulator, when the modulation speed is large, as mentioned earlier, there is the disadvantage of the occurrence of frequency chirping, which forces the use of an external modulation type optical modulator.

Figure 2:
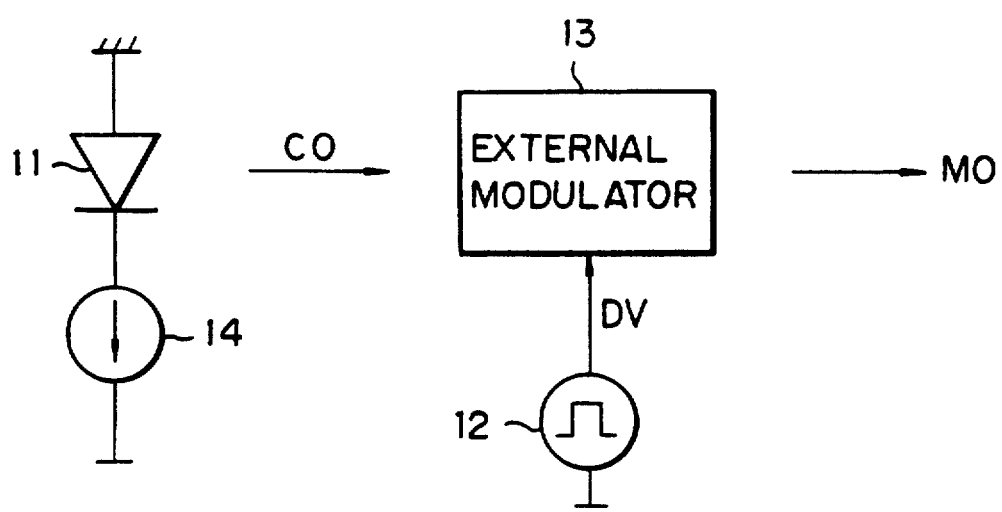
FIG. 2 is a view schematically showing a second aspect of the optical modulator.

FIG. 2 is a schematic view of a second aspect of the optical modulator, which belongs to what are known as external modulation type modulators. In such external modulation type optical modulators, to eliminate the aforementioned frequency chirping, it is necessary to keep the laser diode constituting the light source 11 from blinking and make it transmit continuous light (direct current light) CO. Reference numeral 14 is a direct current source. The continuous light CO is modulated by the external modulator 13. The external modulator 13 is controlled by the driving voltage DV from the driving signal source 12 and transmits the modulated light MO. Therefore, it is possible for the receiving system to receive light signal with minimized waveform deterioration which is caused by frequency chirping and fiber wavelength dispersion.

Figure 3:
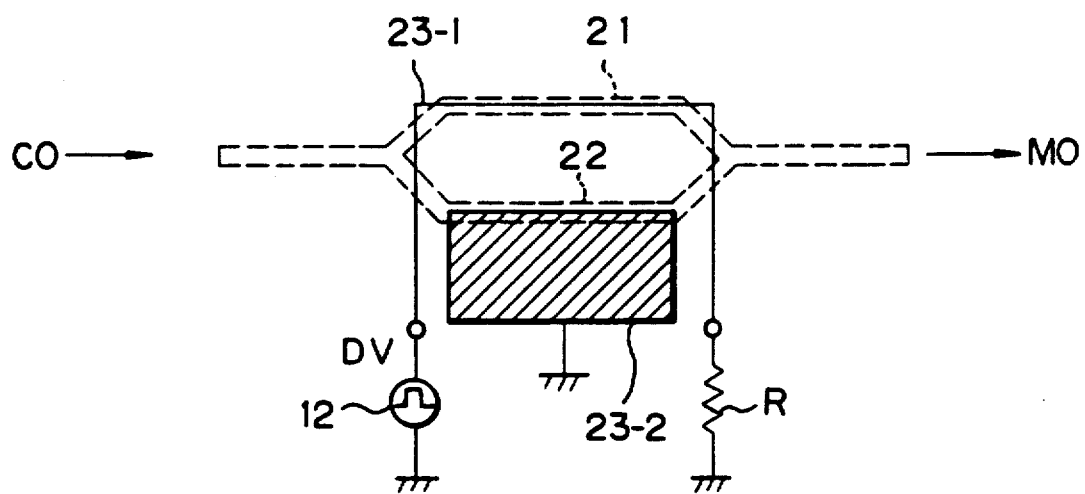
FIG. 3 is a view showing a first prior art of an external modulator.

FIG. 3 is a view of a first prior art of an external modulator. This external modulator is a known Mach-Zehnder interferometer type modulator, which is constructed by a first optical waveguide 21 and a second optical waveguide 22 formed in a substrate (for example, made of $LiNbO_3$), into the input terminals of which continuous light CO, split into two, is input, electrodes 23-1 and 23-2 formed above the same, the already mentioned driving signal source (signal input source) 12 which applies a driving voltage DV to one end of one electrode 23-1, and a terminating resistor R which is connected to the other end. The other electrode 23-2 is ground. To the input terminal is applied the continuous light CO. From the output side is taken out the modulated light MO.

Figure 4A:
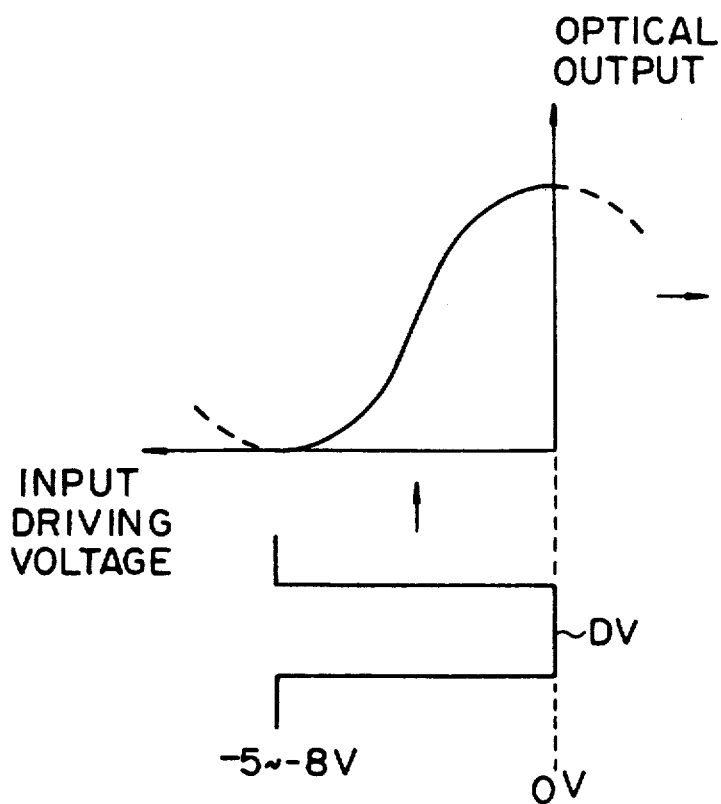
FIG. 4 is a graph for explaining an optical modulation operation in the first prior art.
Figure 4B:
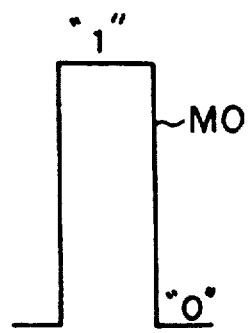

FIG. 4 is a graph for explaining the optical modulation operation in the first prior art. In the figure, the characteristic curve at the top left is that of the input driving voltage vs the optical output. If the pulse like driving voltage DV shown at the bottom left of the figure is input in accordance with that characteristic curve, the pulse like modulated light MO shown at the top right is obtained. Note that the characteristic curve is drawn facing left because a driving voltage of a negative voltage, for example, $-5$ V to $-8$ V, is assumed. For example, if a driving voltage of $-5$ V to $-8$ V is applied, an electrooptic effect is created by the electric field formed between the electrodes 23-1 and 23-2 through the substrate ($LiNbO_3$). Underneath the pair of electrodes 23-1 and 23-2, which form so-called traveling wave electrodes, the continuous light CO propagating through the first and second optical waveguides 21 and 22 deviate in phase 180° from each other. The composite lights at the output ends of the optical waveguides 21 and 22 cancel out each other and become zero ("0"). At this time, the modulated light MO becomes zero. Conversely, when the driving voltage DV is zero volt, the above-mentioned composite lights do not cancel each other out and there is a modulated light MO ("1").

Figure 5:
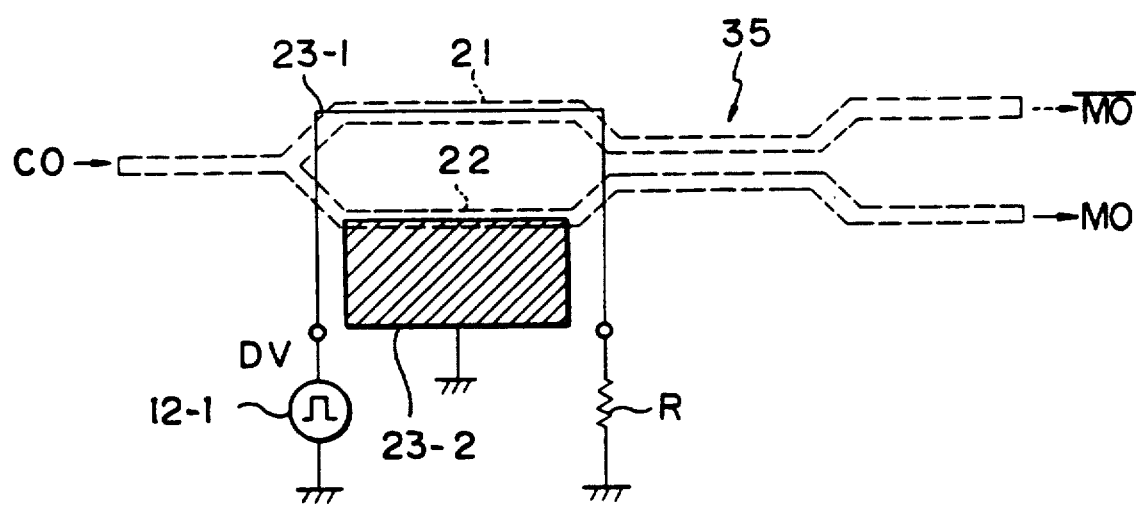
FIG. 5 is a view of a second prior art of an external modulator.

FIG. 5 is a view of a second prior art of an external modulator. This is substantially the same as the aforementioned first prior art (FIG. 3) except that a 3 dB optical coupler 35 is introduced into the optical output end. According to this second prior art, two differential modulated lights MO and $\overline{MO}$ are obtained.

Figure 6A:
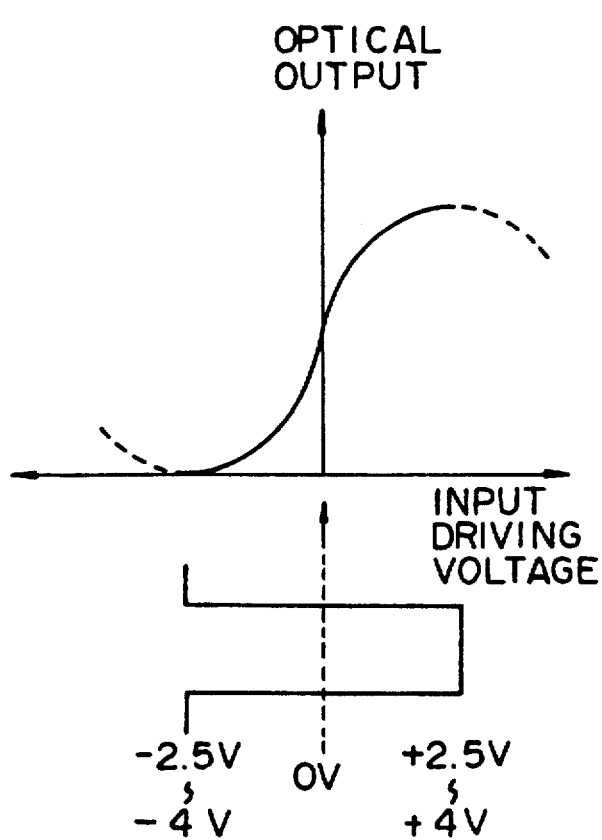
FIG. 6 is a graph for explaining an optical modulation operation in the second prior art.
Figure 6B:
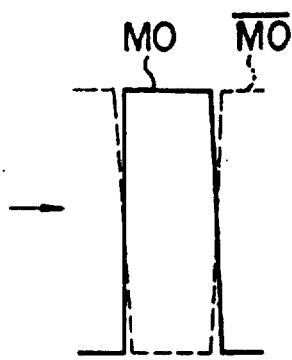

FIG. 6 is a graph for explaining an optical modulation operation in the second prior art. The difference from the above-mentioned first prior art is that the driving voltage DV spans two polarities from $-2.5$ V to $-4$ V and $+2.5$ V to $+4$ V. The advantage of the second prior art from the first prior art is that a complementary modulated light $\overline{MO}$ can be obtained.

There are three major problems with the first prior art and second prior art.

The first relates to the driving voltage DV, mentioned previously. That is, in the first prior art, a high voltage of $-5$ V to $-8$ V is required and it is difficult to make the driving signal source 12 with an actual circuit, especially with an integrated circuit (IC). Usually, the higher speed the operation required the withstand voltage of an IC becomes smaller. For example, even a GaAs IC has a withstand voltage of less than 3 V. Also the high voltage swing degrades the signal modulation speed. Going into further detail, if it is attempted to provide a drive with a large voltage amplitude of −5 V to −8 V, first the effects of the stray capacitance will be large and therefore high speed operation will become difficult and, second, the terminating resistor R will be fixed (50 Ω) and therefore the drive will have to be with a large current amplitude, the stray capacitance of the driving signal source 12 will increase, and high speed operation will become even more difficult.

The second relates to the offset, also mentioned earlier. Annoying voltage drifts in the modulation characteristics and also the temperature fluctuations may arise because of this offset. The cause of this is the asymmetric, coplanar construction of the electrodes (23-1 and 23-2) in both the first and second prior arts, as is clear from FIG. 3 and FIG. 5. Further, in the second prior art, the voltage spans both the positive and negative sides, i.e., −2.5 V to −4 V and +2.5 V to +4 V and also the voltage swing of the drive voltage is the same as that of the first prior art, so the construction of the driving signal source 12 becomes difficult. If the construction is attempted to be made easier, provision may be made of an electrode for applying a separate DC voltage or the first and second optical waveguides may be made asymmetric in structure, but whatever the case, the construction becomes complicated, which makes it impractical.

The third problem, also mentioned above, was that in a high speed optical communication system, it is desired to reduce the spectral spread of the light source as much as possible and prevent the occurrence of waveform deterioration of the optical pulses caused by the spectral spread and the wavelength dispersion of the optical fibers.

Therefore, the external modulation system is advantageous in that it enables reduction of the spectral spread, but even if this system is used, there is a limit to the transmission distance at a transmission speed of over several Gbps due to the spectral spread caused by the modulation side band. Therefore, some measures are required for further improving the transmission characteristics.

The modulation system featuring the smallest spectral spread and therefore resistance to the effects of fiber wavelength dispersion uses a Mach-Zehnder interferometer type modulator. According to this system, as mentioned earlier, it is possible to reduce the spectral spread.

Therefore, in a conventional optical modulation system using a Mach-Zehnder interferometer type modulator, modulation free from frequency chirping has been performed by modulating the phases of the light propagating through the two optical waveguides of the modulator by the same magnitude in opposite directions.

However, at a transmission speed of over several Gbps, even if the frequency chirping is made zero, the deformation of the optical pulses by the spectral spread due to the modulation side band and the wavelength dispersion of optical fibers can no longer be ignored.

Therefore, there is the problem that long distance transmission is impossible in a fiber with a large fiber wavelength dispersion at a transmission speed of over several Gbps even if the spectral spread due to the modulation is reduced to the spread of just the modulation side band.

In consideration of the above-mentioned problems, the present invention provides an optical modulator which can be driven by low voltage, has a driving signal source which can be made by an integrated circuit (IC), which can suppress the offset of the driving voltage and the effects of temperature fluctuations, and which is suited to higher speed operation. With such an optical modulator, the first and second problems can be resolved.

Further, the present invention provides an optical modulator which enables long distance transmission using fibers with large fiber wavelength dispersions even at transmission speeds of over several Gbps. Using this optical modulator, it is possible to resolve the above third problem.

Figure 7:
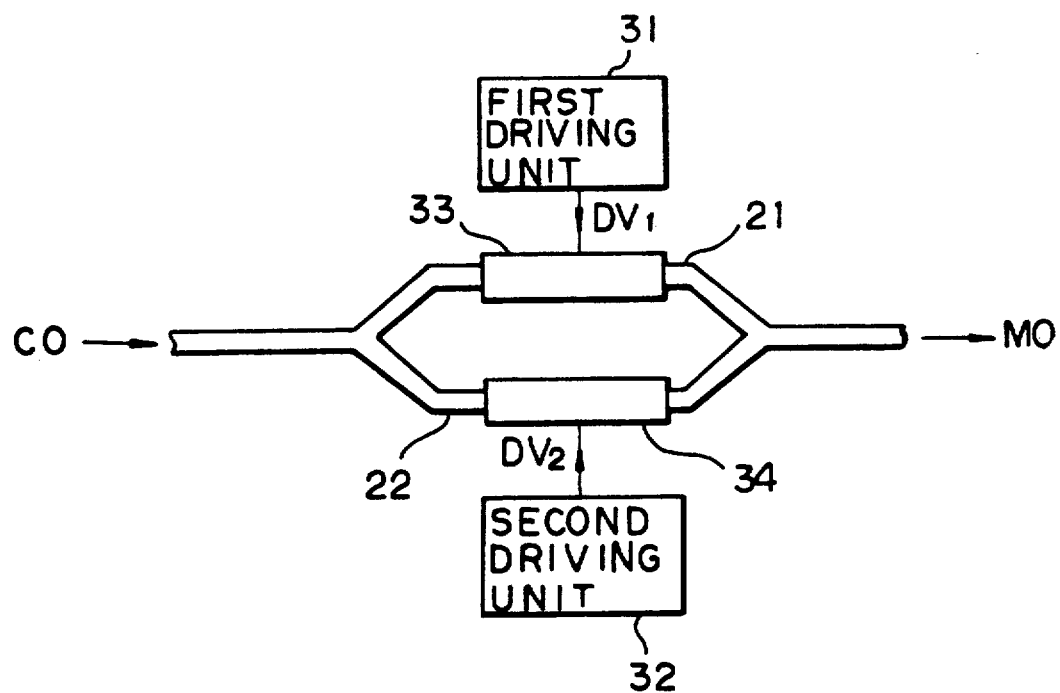
FIG. 7 is a block diagram of the principle and constitution of an optical modulator based on the present invention.

FIG. 7 is a block diagram of the principle and constitution of an optical modulator based on the present invention. The optical modulator of the present invention basically is constructed of a Mach-Zehnder interferometer type modulator comprised of a first optical waveguide 21 and a second optical waveguide 22, a first electrode 33 and a second electrode 34 which cooperates with the first optical waveguide 21 and second optical waveguide 22, a driving means which imparts relative changes to the light phases of the first and second optical waveguides 21 and 22 through the first and second electrodes 33 and 34. Here, the driving means is constructed of a first driving unit 31 and a second driving unit 32 which independently drive the first electrode 33 and second electrode 34. The first and second driving units 31 and 32 apply first and second driving voltages $DV_1$ and $DV_2$ determined individually to the first and second electrodes 33 and 34.

The principle of the operation of the above-mentioned optical modulator will be clear from the explanation of the following embodiments disclosed below.

Figure 8A:
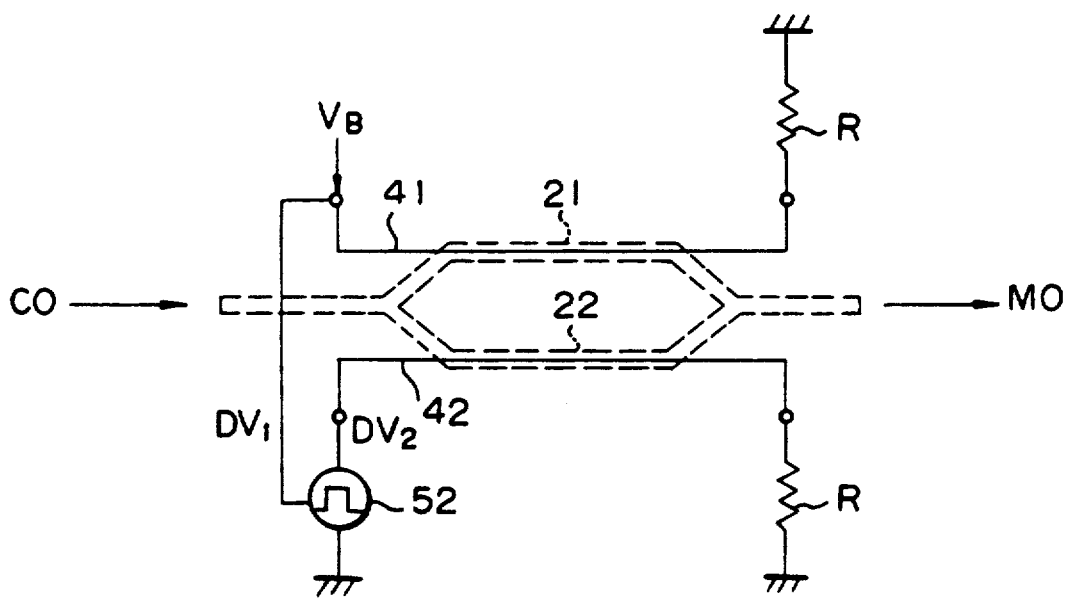
FIG. 8A is a view of a first embodiment of an optical modulator according to the present invention.

FIG. 8A is a view of a first embodiment of an optical modulator according to the present invention. Note that throughout the figures, the same elements are shown by the same reference numerals or symbols. There are two characterizing features: First, the pair of electrodes (33 and 34 of FIG. 7) are constituted so that the first line electrode 41 and second line electrode 42 provided on the first and second optical waveguides 21 and 22, respectively, form a mutually symmetric coupled line, thus eliminating the conventional asymmetric, coplanar electrode structure. Second, use is made of a single driving unit 52 which outputs a differential first driving voltage $DV_1$ and second driving voltage $DV_2$.

Figure 8B:
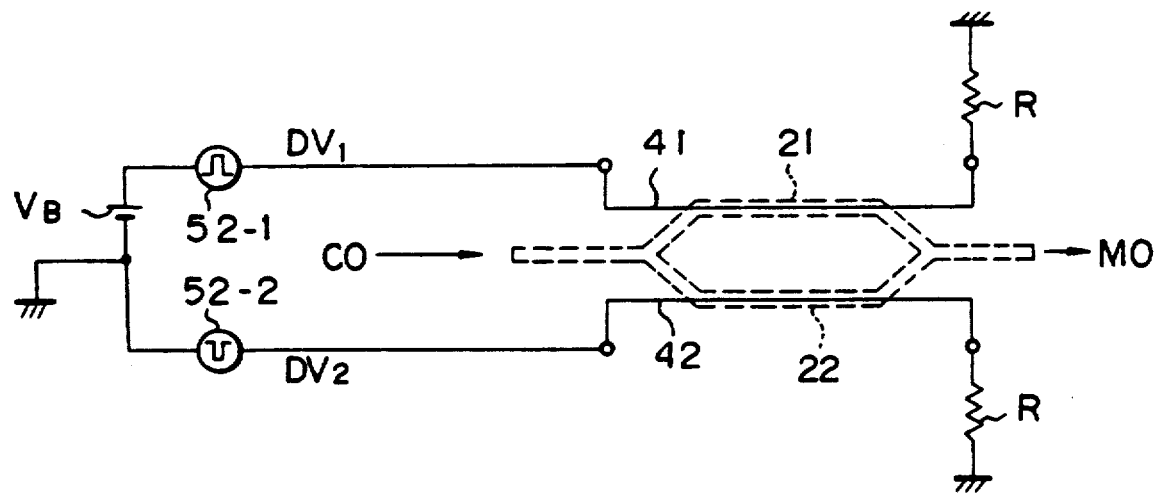
FIG. 8B is a view showing a DC bias means for the embodiment of FIG. 8A.
Figure 9:
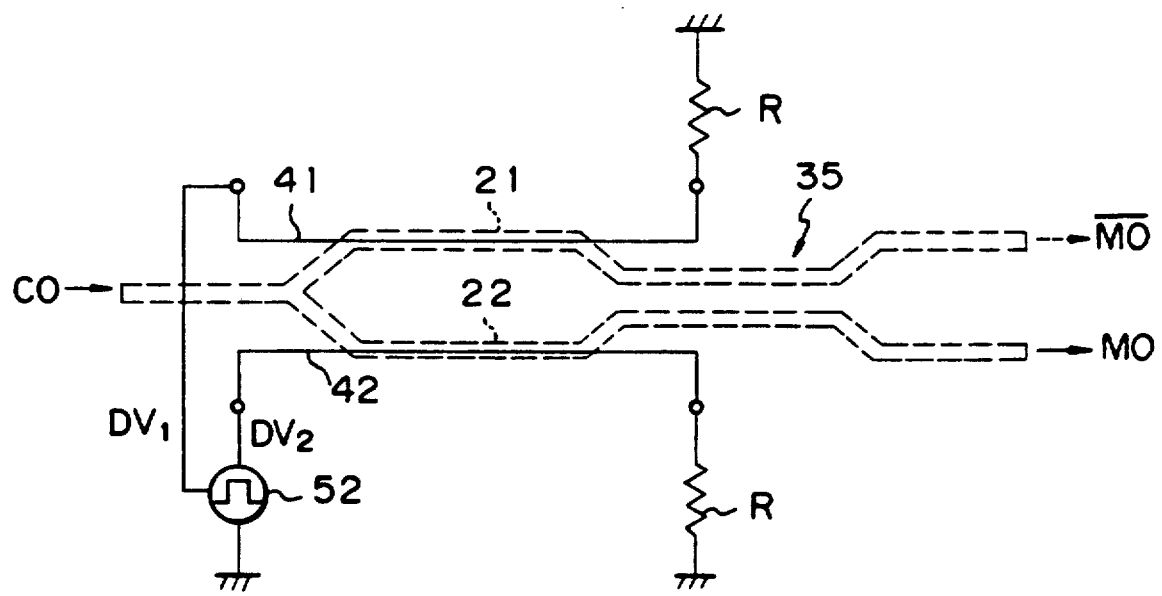
FIG. 9 is a view of a modification of the first embodiment of the present invention.

FIG. 9 is a view of a modification of the first embodiment of the present invention. Compared with the case of FIG. 8A, a 3 dB optical coupler 35 is introduced so that two modulated lights MO and $\overline{MO}$ may be taken out separately from the output ends of the 3dB optical coupler 35. According to this modification, the phase difference of 90° of the light in the optical waveguides 21 and 22 is augmented by the phase difference of 90° caused by the 3 dB optical coupler 35 (for a total of 180°), so it is possible to independently take out two differential modulated lights MO and $\overline{MO}$. In the construction of FIG. 8A, one of the electrodes 41 or 42 had to be given a DC bias voltage $V_B$ (2.5 to 4 V). FIG. 8B shows an example of the bias. Therefore, in the construction of FIG. 9, the DC bias voltage $V_B$ is unnecessary, and both of the electrodes 41 and 42, as shown in the later mentioned FIG. 10, may be given the same level signal, thus simplifying the construction of the driving source 52. Note that one of the modulated lights (for example, MO) in FIG. 9 may be used as a monitoring light.

The principles of the operations of the optical modulator shown in FIG. 8A and FIG. 9 are the same except for the above-mentioned bias voltage, so an explanation will be made of the operation of FIG. 9 as an example. Further, FIG. 10 is a graph for explaining the operation of the present invention. The graph should be viewed in the same way as the graphs of the prior art (FIG. 4 and FIG. 6), but there is a difference in that it is divided into the first driving voltage $DV_1$ and the second driving voltage $DV_2$. Note that the phase difference between the optical output in the first optical waveguide 21 due to the first driving voltage $DV_1$ and the optical output in the second optical waveguide 22 due to $DV_2$ is 90° (phase difference of 180° in the prior art), to make the story simple, the driving voltage is now fixed as 8 V. At a time $t_1$, $DV_1$ is 0 V, while $DV_2$ is $-4$ V, while at a time $t_2$, $DV_1$ is $-4$ V, while $DV_2$ is 0 V. The optical outputs created by the $DV_1$ and the $DV_2$ are obtained from the corresponding curves. At the time $t_1$, $DV_1=0$ V, $DV_2=-4$ V, so MO="0" and $\overline{MO}$="1". At the time $t_2$, $DV_1=-4$ V and $DV_2=0$ V, so MO="1" and $\overline{MO}$="0".

The electrode structure becomes a symmetric coupled line (41 and 42) and the driving voltages $DV_1$ and $DV_2$ are applied differentially, so the offset and effects of temperature fluctuations disappear. That is, the unbalance in characteristics arising from the asymmetric electrode structure as in the past is eliminated.

Further, the grounded electrode 23-2 in the prior art is eliminated, but there is still the potential for this as a virtual ground between the symmetric coupled line electrodes (41 and 42). Also, by this differential construction, the driving voltage may be substantially halved from the conventional $-5$ V to $-8$ V to $-2.5$ V to $-4$ V and use of an IC becomes possible.

Figure 11:
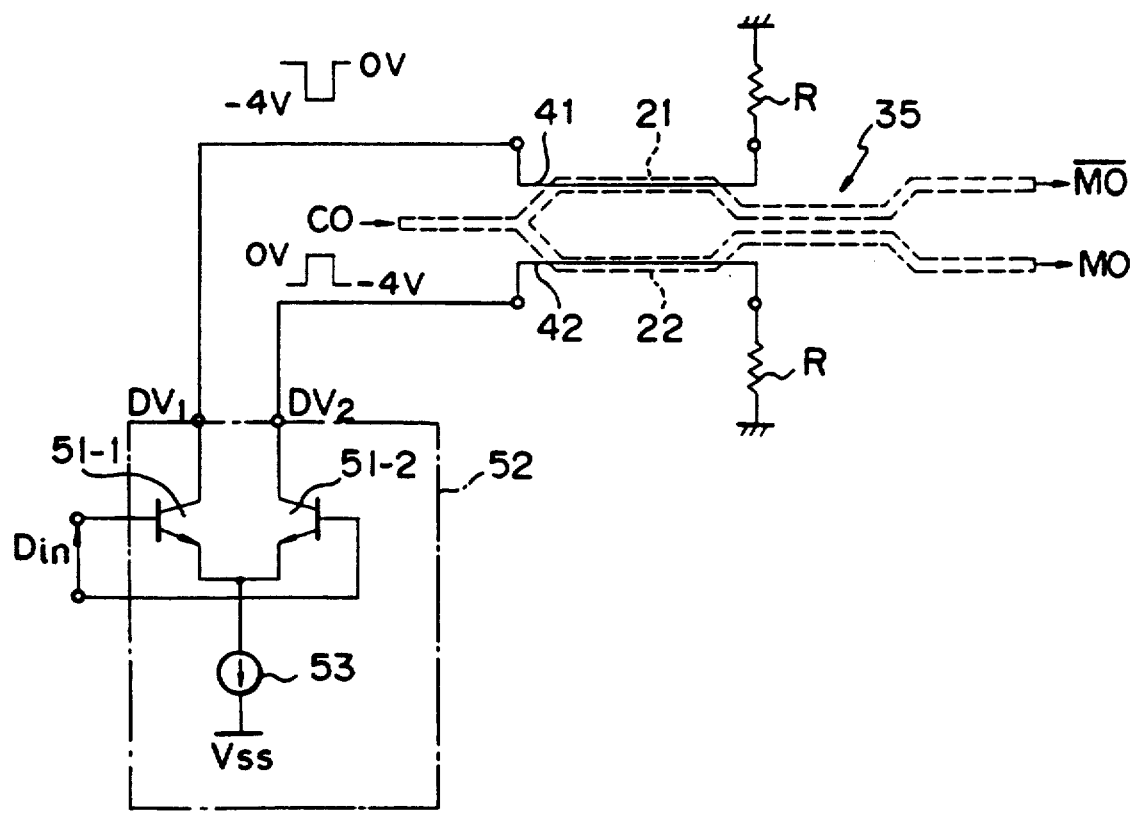
FIG. 11 is a view of an example of the construction of a single driving unit.

FIG. 11 is a view of an example of the construction of a single driving unit. As illustrated, the single driving unit 52 is constructed basically of a differential transistor circuit. Reference numeral 53 is a constant current source. A negative voltage source $V_{ss}$ is provided to pull in the constant current. At the collectors of the pair of differential transistors 51-1 and 51-2 appear the first and second differential voltages $DV_1$ and $DV_2$ based on the voltage drop due to the terminating resistors R. An example of the waveforms of the $DV_1$ and $DV_2$ is given in the figure. $D_{in}$ is a data input.

Figure 12:
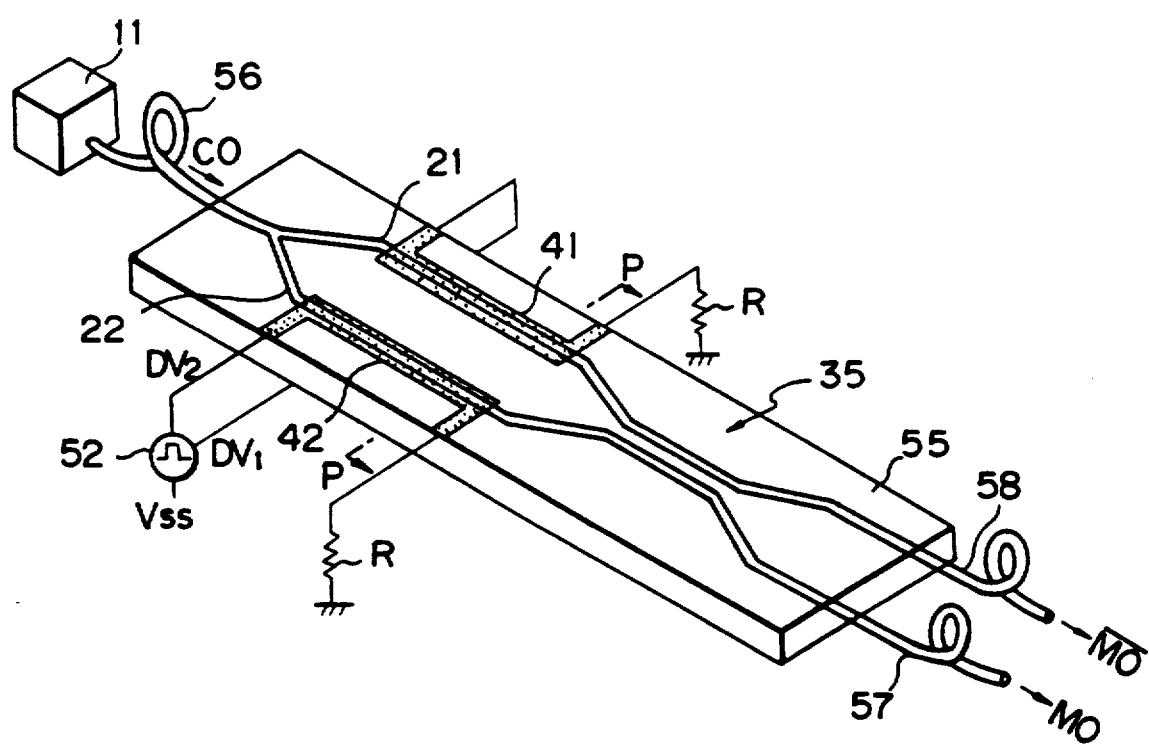
FIG. 12 is a perspective view of the optical modulator shown in FIG. 9.
Figure 13:
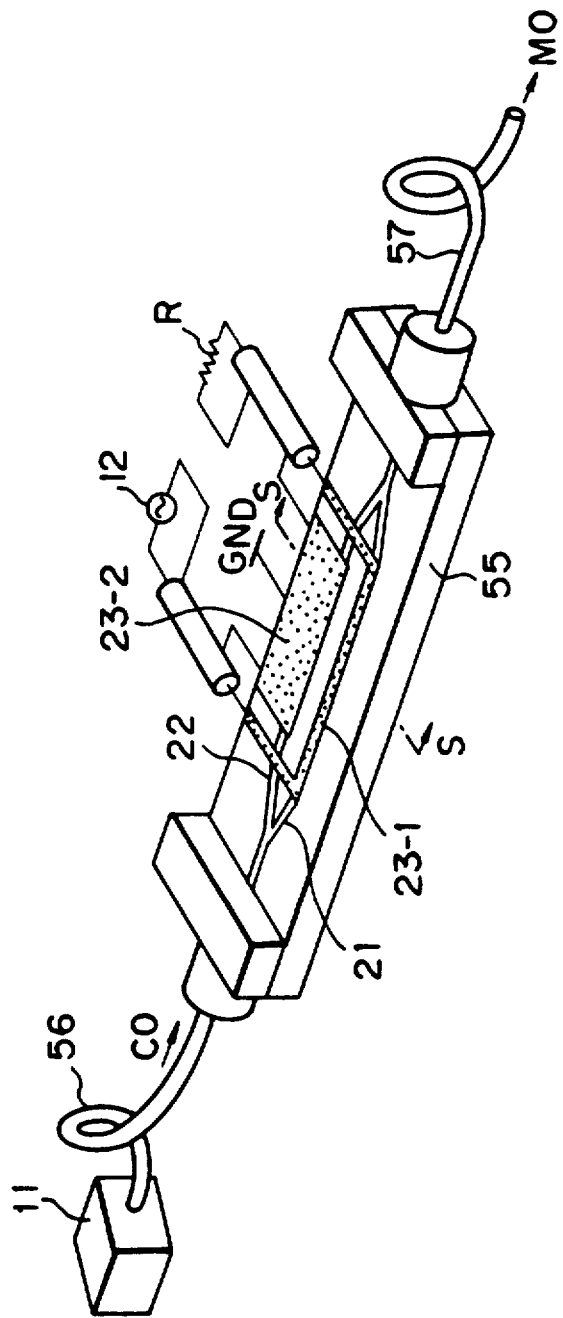
FIG. 13 is a perspective view of an optical modulator according to a prior art for comparison with the first embodiment of the present invention.

FIG. 12 is a perspective view of the optical modulator shown in FIG. 9. FIG. 13 is a perspective view of an optical modulator according to a prior art for comparison with the first embodiment of the present invention. In FIG. 12, the continuous light CO from the light source 11 (laser diode etc.) is guided into the input side optical fiber 56 and is put into one end of the substrate ($LiNbO_3$). In the substrate 55 are formed the optical waveguides 21 and 22, on top of which are formed the symmetric coupled-line electrodes 41 and 42. the modulated light is guided through the 3 dB optical coupler 35 to the output side optical fibers 57 and 58 and taken out as the modulated light MO and $\overline{MO}$.

FIG. 13 shows a first prior art of the aforementioned Mach-Zehnder interferometer type modulator, wherein the structure of the pair of electrodes 23-1 and 23-2 is changed as in the coupled line electrodes 41 and 42 of FIG. 12 in the present invention, and also the single driving source 12 of FIG. 13 is changed as in the differential driving source 52 of FIG. 12.

Figure 14A:
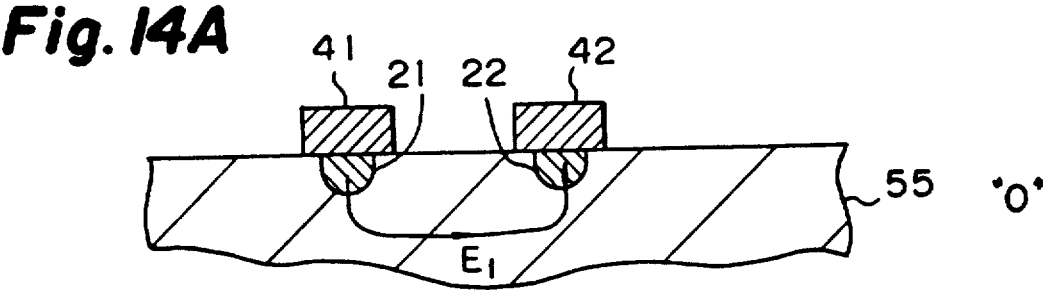
FIG. 14 is a partial sectional view of an optical modulator according to the first embodiment of the present invention.
Figure 14B:
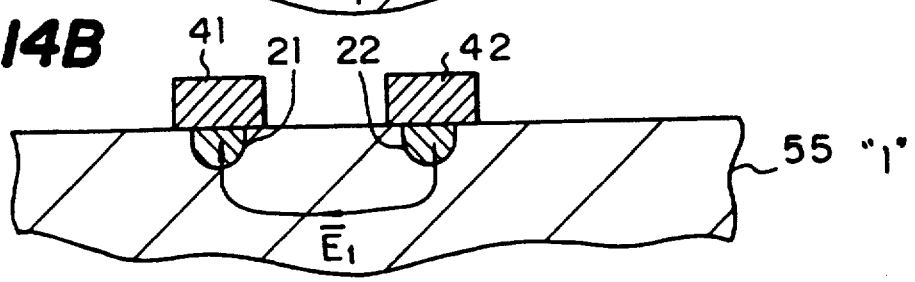
Figure 15A:
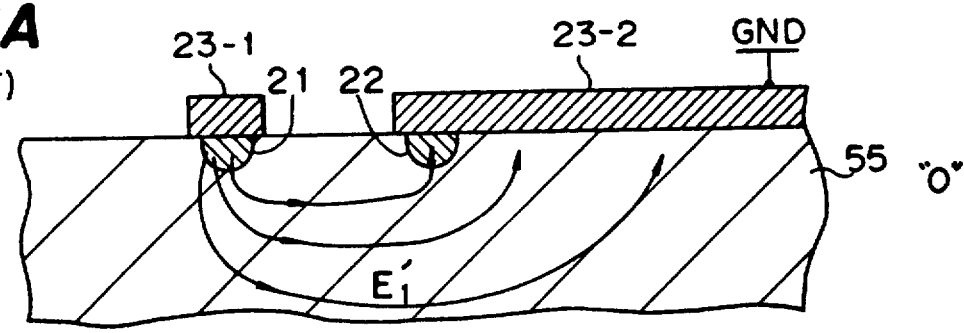
FIG. 15 is a partial sectional view of an optical modulator of the prior art for comparison with the first embodiment of the present invention.
Figure 15B:
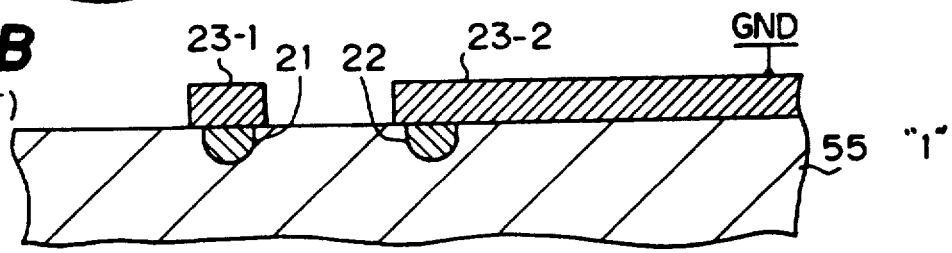

FIG. 14 is a partial sectional view of an optical modulator according to the first embodiment of the present invention. FIG. 15 is a partial sectional view of an optical modulator of the prior art for comparison with the first embodiment of the present invention. In FIG. 14, the top portion shows the electric field $E_1$ in the substrate 55 when the modulated light shows the logical "0", while the lower portion shows the electric field $\overline{E}_1$ in the substrate 55 when the modulated light shows the logical "1". $E_1$ and $\overline{E}_1$ are opposite to each other in direction. On the other hand, the top portion of FIG. 15 shows the electric field $E_1'$ in the substrate 55 when the modulated light shows a logical "0", while the lower portion shows that no electric field is produced when the modulated light shows a logical "1". Note that FIG. 14 and FIG. 15 are sectional views along the line P—P in FIG. 12 and S—S in FIG. 13. It is clear from a comparison of FIG. 14 and FIG. 15 that in the case of the first embodiment (FIG. 14), when the modulated light is logical "0" and "1", the phase difference of the light in the first and second optical waveguides 21 and 22 is $+90°$ and $-90°$, respectively, and the intensities of the electric fields $E_1$ and $\overline{E}_1$ are less than half of that of the prior art $E_1'$. The phase difference of the light in the first and second optical waveguides 21 and 22 in the prior art (FIG. 15) had to be made 180°, twice that of the phase difference in the first embodiment (90°). In proportion to this, the intensity of the electric field $E_1'$ had to be made more than twice the intensity of the electric fields $E_1$ and $\overline{E}_1$. This means that the driving voltages $DV_1$ and $DV_2$ in the first embodiment may be less than half those of the prior art.

The second to ninth embodiments explained below relate in particular to the aforesaid third problem in the prior art.

Figure 16:
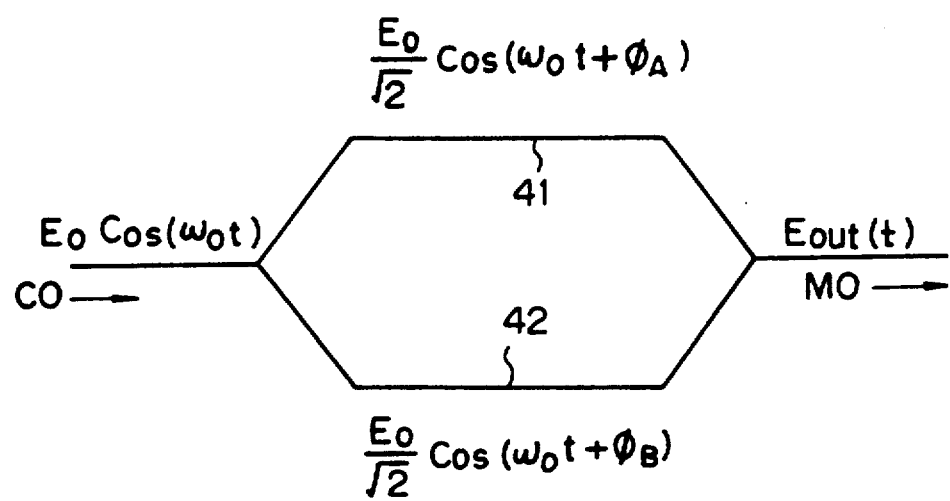
FIG. 16 is a view for explaining the principle of the second and later embodiments of the present invention.

FIG. 16 is a view for explaining the principle of the second and later embodiments of the present invention. FIG. 17 is a waveform diagram used for explaining FIG. 16.

FIG. 16 shows the electric field of light at various portions of the Mach-Zehnder interferometer type modulator. In the figure, $E_0$ is the amplitude of the electric field of the input light CO, $\omega_0$ is the angular frequency of the electric field of the light, t is the time, and $\phi_A$ and $\phi_B$ are the phases of the light modulated in the first and second optical waveguides 41 and 42. Eout(t) is the electric field of the modulated light (MO). Details are given by the following equation (1).

$$Eout(t) = E_0/2\{Cos(\omega_0 t + \phi_A) + Cos(\omega_0 t + \phi_B)\} \quad (1)$$
$$= E_0/2(X^2 + Y^2)^{\frac{1}{2}}Cos\{\omega_0 t - \tan^{-1}(Y/X)\}$$

where, $$X = Cos(\phi_A) + Cos(\phi_B)$$

and $$Y = Sin(\phi_A) + Sin(\phi_B)$$

As will be understood from the above equation (1), phase modulation of $\tan^{-1}(Y/X)$ is applied to the Eout(t). This becomes frequency chirping as shown below.

If $\omega_0 t - \tan^{-1}(Y/X)$ is set at $\phi$, the angular frequency can be expressed as $\omega(t) = d\phi/dt = \omega_0 - d\{\tan^{-1}(Y/X)\}/dt$ and the wavelength can be expressed as $\lambda = 2\pi c/\omega(t)$ (where c is the speed of light). Therefore, the phase modulation of $\tan^{-1}(Y/X)$ causes fluctuation of the wavelength $\lambda$, that is, frequency chirping.

Here, the phase modulation is performed as follows.

$$\phi_A > 0, \phi_B < 0, ABS(\phi_A) > ABS(\phi_B)$$

$$ABS(\phi_B - \phi_A) \approx 0 \text{(light output high)}$$

$$ABS(\phi_B - \phi_A) \approx \pi \text{(light output low)}$$

where, $ABS(\phi)$ is the absolute value of $\phi$. That is $|\phi|$.

The operational waveforms of various portions at this time are shown in FIG. 17. As shown by (f) in FIG. 17, the phase of the output light is delayed at the rising edge of the intensity of the output light and advanced at the falling edge. Corresponding to this, the center wavelength $\lambda_0$ moves to the long wavelength side at the rising edge and the short wavelength side at the falling edge, as shown by (g) in FIG. 17.

In the past, modulation was performed under the condition of $\phi_A = -\phi_B$. In this case, Eout(t) becomes as shown by equation (2):

$$\text{Eout}(t) = E_0 \cos(\phi) \cos(\omega_0 t) \qquad (2)$$

where, $$\phi = \phi_A = -\phi_B$$

In this case, the amplitude of the electric field of the light is just modulated by the modulation of $\phi$, and there is no fluctuation in wavelength accompanying the modulation.

By asymmetrically modulating the phase of the light of the optical waveguides 41 and 42 of the optical modulator, the center wavelength $\lambda_0$ of the modulated light is, as shown in (g) of FIG. 17, made to move to the long wavelength side at the rising edge and the short wavelength side at the falling edge.

On the other hand, the wavelength dispersion of the optical fiber is large in the case of use of a single mode optical fiber with a 1.3 μm band zero dispersion, in the 1.55 μm band, at which the smallest loss is given. The coefficient of dispersion at this time is a maximum 20 ps/nm/km. The longer the wavelength, the slower the speed of propagation through the optical fiber.

Therefore, due to the frequency chirping arising due to the principle of FIG. 16 and FIG. 17 the rising edge of the optical pulse is delayed by the fiber dispersion, the falling edge is advanced, and pulse compression occurs. This works to compensate for the spread of the waveform caused by both the modulation side band and the optical fiber wavelength dispersion and acts to lengthen the transmittable optical fiber length. Pulse compression means that the pulse width is made narrower toward the center of the pulse.

In a Mach-Zehnder interferometer type modulator, as mentioned earlier, use is made of the electrooptic effect for realizing phase modulation of the light. That is, the index of refraction of a substance having an electrooptic effect is changed by the electric field by the electrode so as to change the phase of the light.

In a Mach-Zehnder interferometer type modulator, there are several methods conceivable for asymmetrically modulating each phase of the light propagating through the two optical waveguides. One is the method of modulation by driving voltages differing for the optical waveguides. The second is making the driving voltages the same, but the sectional structures of the electrodes asymmetric so as to make the application of the modulating electric fields to the optical waveguides asymmetric. The third is to change the lengths of the electrodes in the optical waveguides and thus change the lengths of the optical waveguides at which the changes in the index of refraction can be sensed.

FIG. 18A is a view of the construction of a second embodiment of the present invention. In the second embodiment, the driving voltages $DV_1$ and $DV_2$ are applied asymmetrically to the electrodes 33 and 34. In the figure, the optical phase modulation in the first optical waveguide 21 is large, and the optical phase modulation in the second optical waveguide 22 is small.

Further, the first electrode 33 is comprised of the first pair of separated electrodes 33-1 and 33-2, while the second electrode 34 is comprised of the second pair of separated electrodes 34-1 and 34-2. These are shown by hatching for easier understanding. By these pairs, a so-called travelling-wave type electrode is constructed. Between the electrodes of each pair, as illustrated, there are connected terminating resistors R. The characteristic impedances of the travelling wave type electrodes are matched. The lengths of the electrodes 33 and 34 are equal.

Figure 18B:
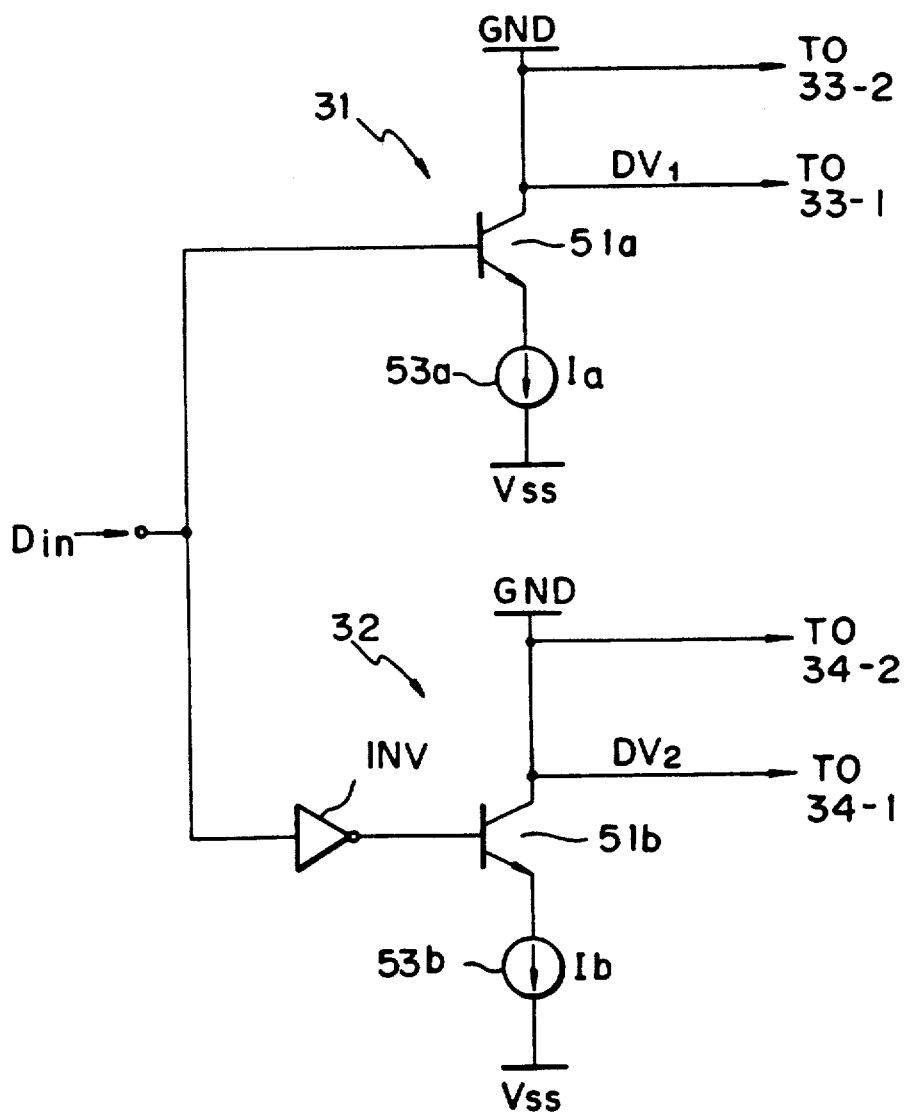
FIG. 18B is a view of an example of the circuit of the first and second driving units.

FIG. 18B is a view of an example of the circuit of the first and second driving units. In the figure, reference numerals 51a and 51b are transistors for outputting the driving voltages $DV_1$ and $DV_2$. At the bases of these transistors are applied the data input Din. However, at one transistor side, the inverter INV is inserted. Further, constant current sources 53a and 53b are connected to the transistors. It is also possible to make the magnitudes of the currents Ia and Ib different (Ia > Ib or Ia < Ib).

Figure 19A:
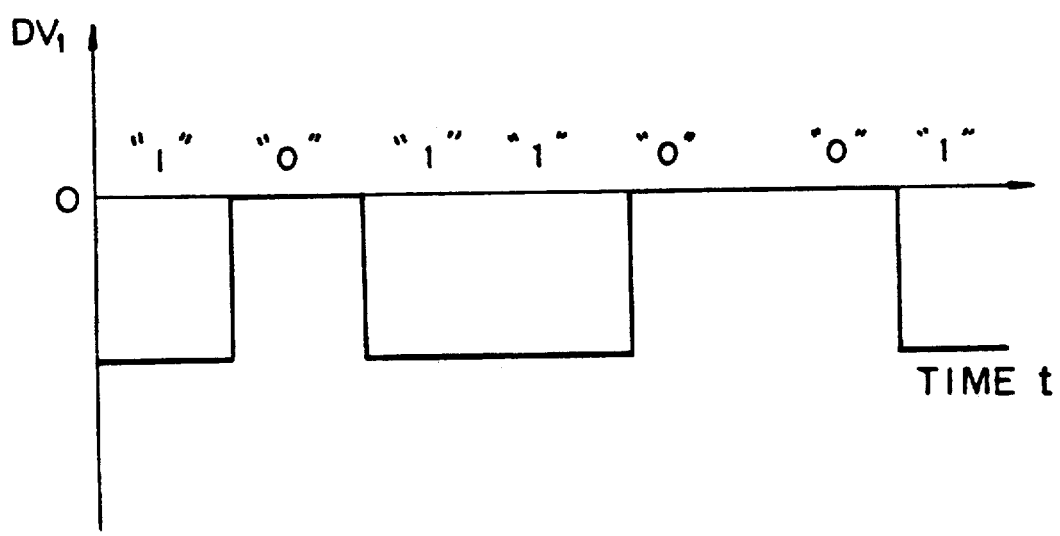
FIG. 19 is a time chart showing the operation of the second embodiment.
Figure 19B:
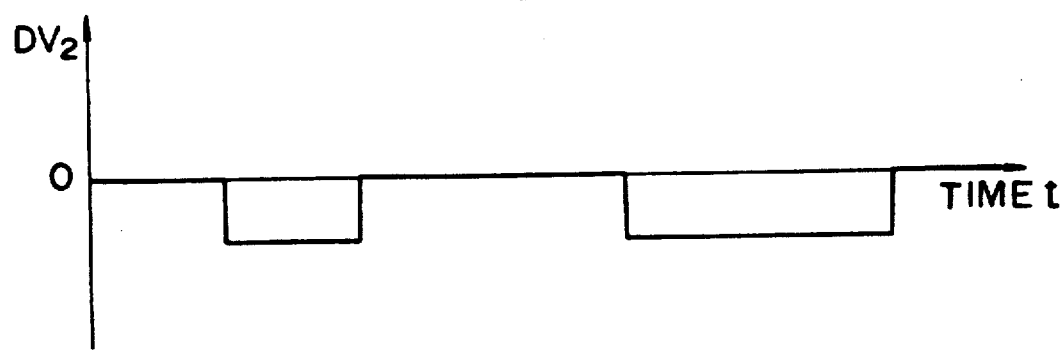

FIG. 19 is a time chart showing the operation of the second embodiment. $DV_1$ is the driving waveform for the phase modulation in optical waveguide 21, while $DV_2$ is the driving waveform for the phase modulation in optical waveguide 22. The polarities are reversed by $DV_1$ and $DV_2$ and the amplitude of the driving voltage made larger for $DV_1$, whereby the phase modulation is made asymmetric.

Looking at the position of the separated electrodes 33-1 and 34-1, the first and second optical waveguides 21 and 22 are both formed in the substrate 55, made of a Z-cut electrooptic effect crystal. Over the first and second optical waveguides 21 and 22 are overlappingly formed the driving voltage side electrodes 33-1 and 34-1 of the first and second pairs of separated electrodes 33 and 34. Alternatively, the first and second optical waveguides 21 and 22 are formed in a substrate consisting of X- or Y-cut electrooptic effect crystal. Apart from the first and second optical waveguides 21 and 22 are formed the driving voltage side electrodes of the first and second pairs of separated electrodes. The plane view of this state corresponds to the case of equal lengths of the electrodes 33 and 34 in the later mentioned FIG. 21.

Figure 20:
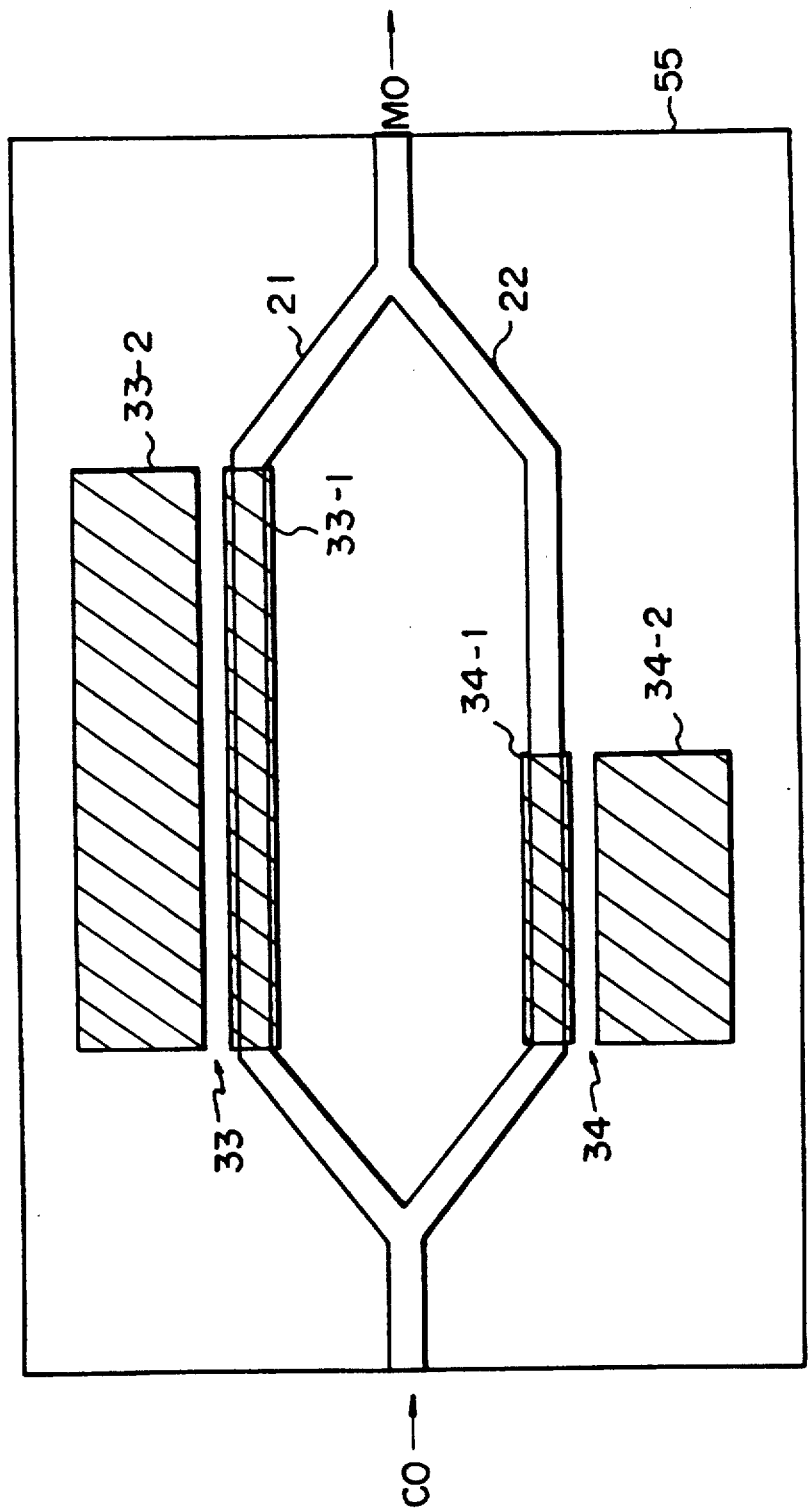
FIG. 20 is a plane view of a third embodiment of the present invention.

FIG. 20 is a plane view of a third embodiment of the present invention (hereinafter, only electrodes are shown for brevity). In this embodiment, the first and second pairs of separated electrodes 33-1, 33-2 and 34-1, 34-2 have mutually different lengths. The first and second pairs of separated electrodes receive the first and second driving voltages $DV_1$ and $DV_2$ having the same levels. By this, the phase modulations of the light may be made mutually asymmetrical for the optical waveguides 21 and 22.

In the third embodiment, the first and second optical waveguides 21 and 22 are both formed in the substrate 55, made of a Z-cut electrooptic effect crystal. Over the first and second optical waveguides 21 and 22 are overlappingly formed the driving voltage side electrodes 33-1 and 34-1 of the first and second pairs of separated electrodes 33 and 34.

Figure 21:
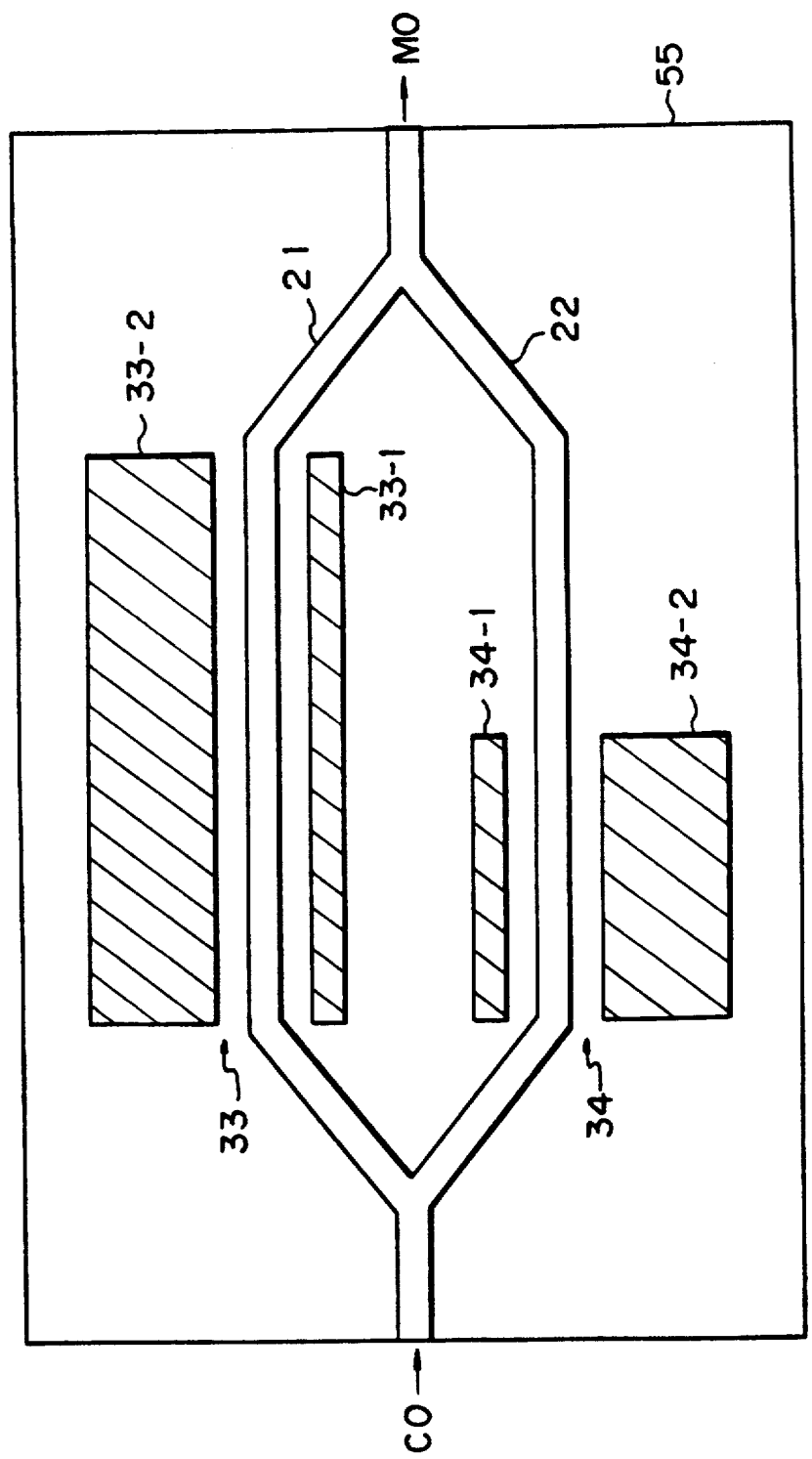
FIG. 21 is a plane view of a fourth embodiment of the present invention.

FIG. 21 is a plane view of a fourth embodiment of the present invention. The first and second optical waveguides 21 and 22 are both formed in the substrate 55, made of an X- or Y-cut electrooptic effect crystal. Away from the first and second optical waveguides 21 and 22 are formed the driving voltage side electrodes 33-1 and 34-1 of the first and second pairs of separated electrodes 33 and 34.

Figure 22:
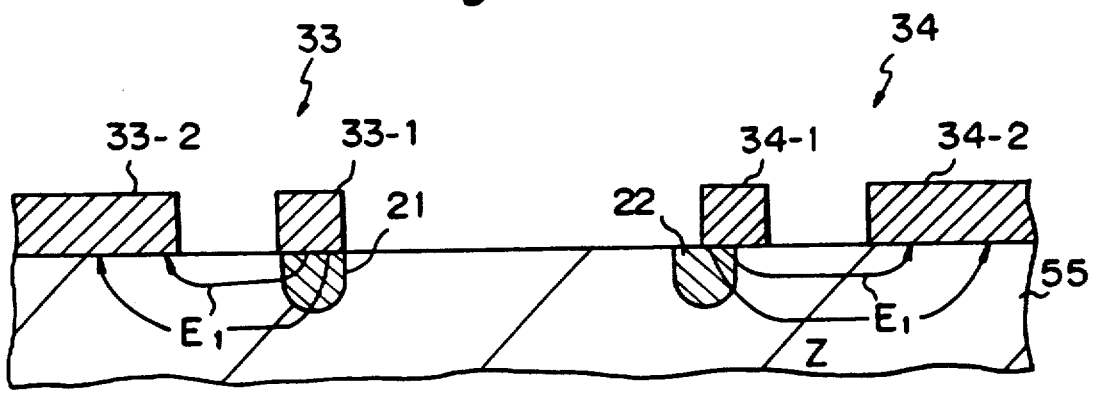
FIG. 22 is a sectional view of a fifth embodiment of the present invention.

FIG. 22 is a sectional view of a fifth embodiment of the present invention. The positional relationship, when seen from a sectional view, of the first pair of separated electrodes 33 to the first optical waveguide 21 and the positional relationship, when seen from a sectional view, of the second pair of separated electrodes 34 to the second optical waveguide 22 are asymmetrical. That is, the pair of separated electrodes 34 is shifted slightly to the right in the figure.

In this case, the first and second optical waveguides 21 and 22 are both formed in the substrate 55, made of a Z-cut electrooptic effect crystal. Over the first and second optical waveguides 21 and 22 are overlappingly formed the driving voltage side electrodes 33-1 and 34-1 of the first and second pairs of separated electrodes 33 and 34. A Z-cut electrooptic effect crystal is used because the electric fields $E_1$ traverse the inside of the first and second optical waveguides 21 and 22 in the vertical direction.

Figure 23:
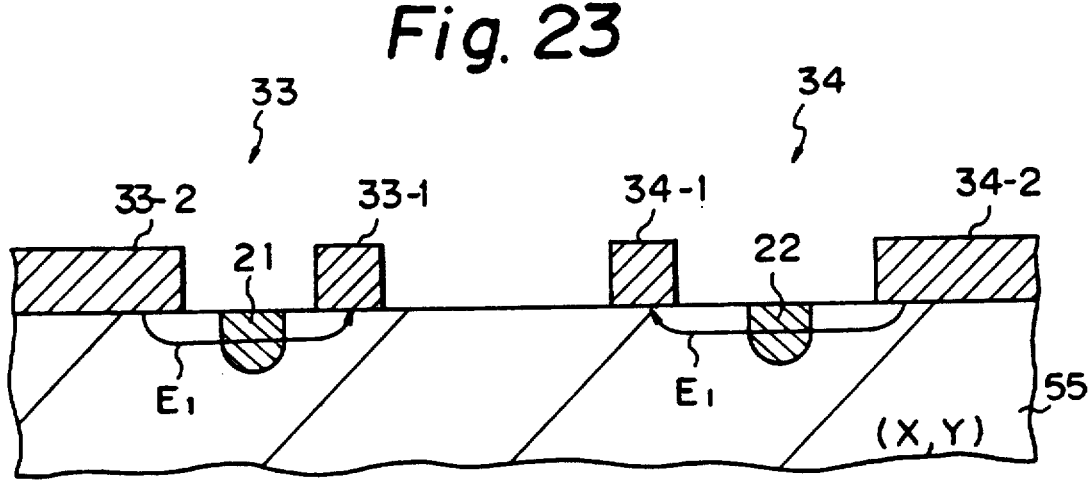
FIG. 23 is a sectional view of a sixth embodiment of the present invention.

FIG. 23 is a sectional view of a sixth embodiment of the present invention. The first and second optical waveguides 21 and 22 are both formed in the substrate 55, made of an X- or Y-cut electrooptic effect crystal. Away from the first and second optical waveguides 21 and 22 are formed the driving voltage side electrodes 33-1 and 34-1 of the first and second pairs of separated electrodes 33 and 34. An X- or Y-cut electrooptic effect crystal is used because the electric fields $E_1$ traverse the inside of the first and second optical waveguides 21 and 22 in the horizontal direction.

Figure 24:
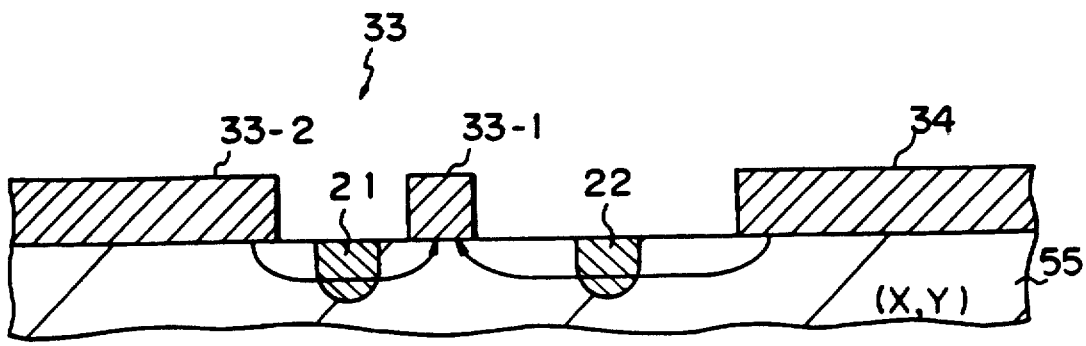
FIG. 24 is a sectional view of a seventh embodiment of the present invention.

FIG. 24 is a sectional view of a seventh embodiment of the present invention. The optical modulator of the seventh embodiment is as follows. The first electrode 33 is constructed of a pair of separated electrodes 33-1 and 33-2 separated along the first optical waveguide 21. The second electrode 34 is formed along the second optical waveguide 22 but away from the same (22) and is grounded. One of the pair of separated electrodes, 33-1, forming the first electrode 33 receives at one end a corresponding driving voltage $DV_1$ and is connected at the other end to one end of the other of the pair of separated electrodes 33-2 through the terminating resistor R, the other end of the other of the pair of separated electrodes 33-2 being grounded. The separated electrode 33-1 of the driving voltage side, when viewed sectionally, is placed at an asymmetric position with respect to the first and second optical waveguides 21 and 22, and the first and second optical waveguides are formed in the substrate, constituted by an X- or Y-cut electrooptic effect crystal.

Figure 25:
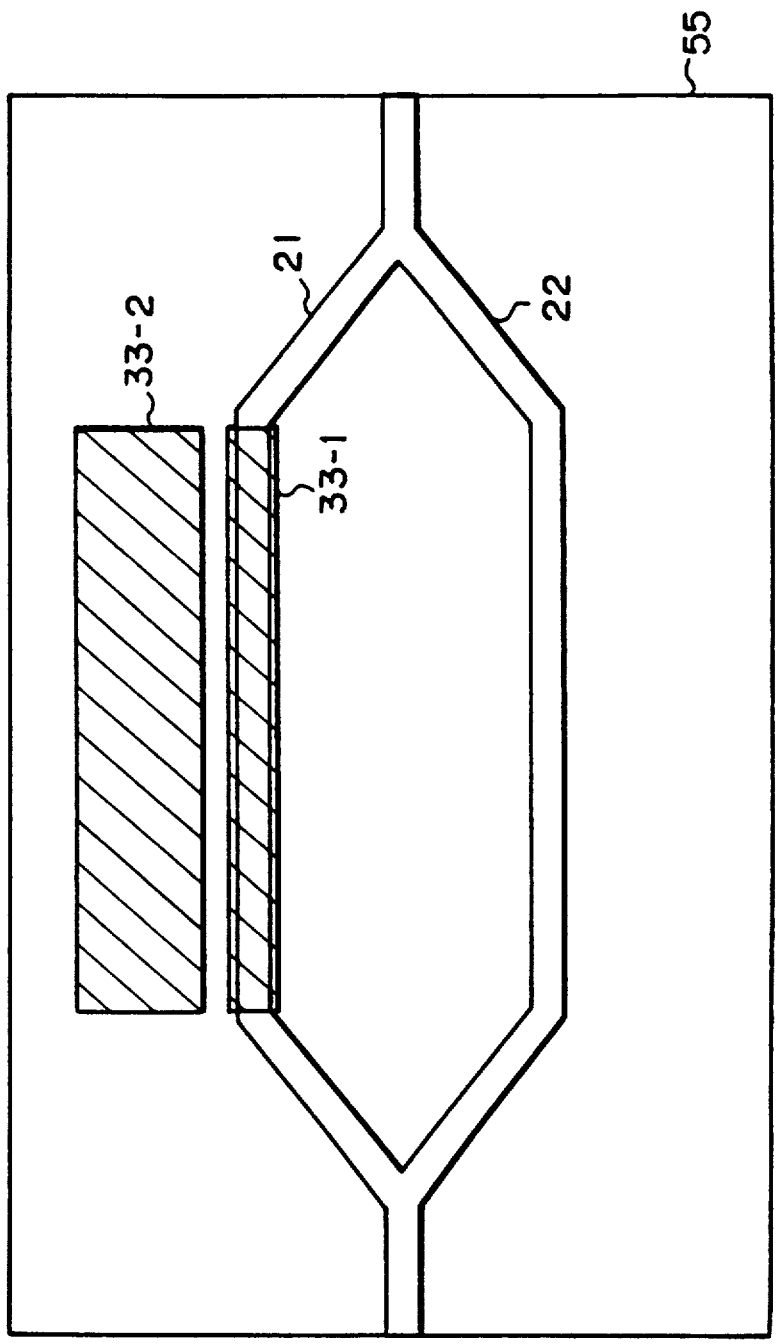
FIG. 25 is a plane view of an eighth embodiment of the present invention.
Figure 26:
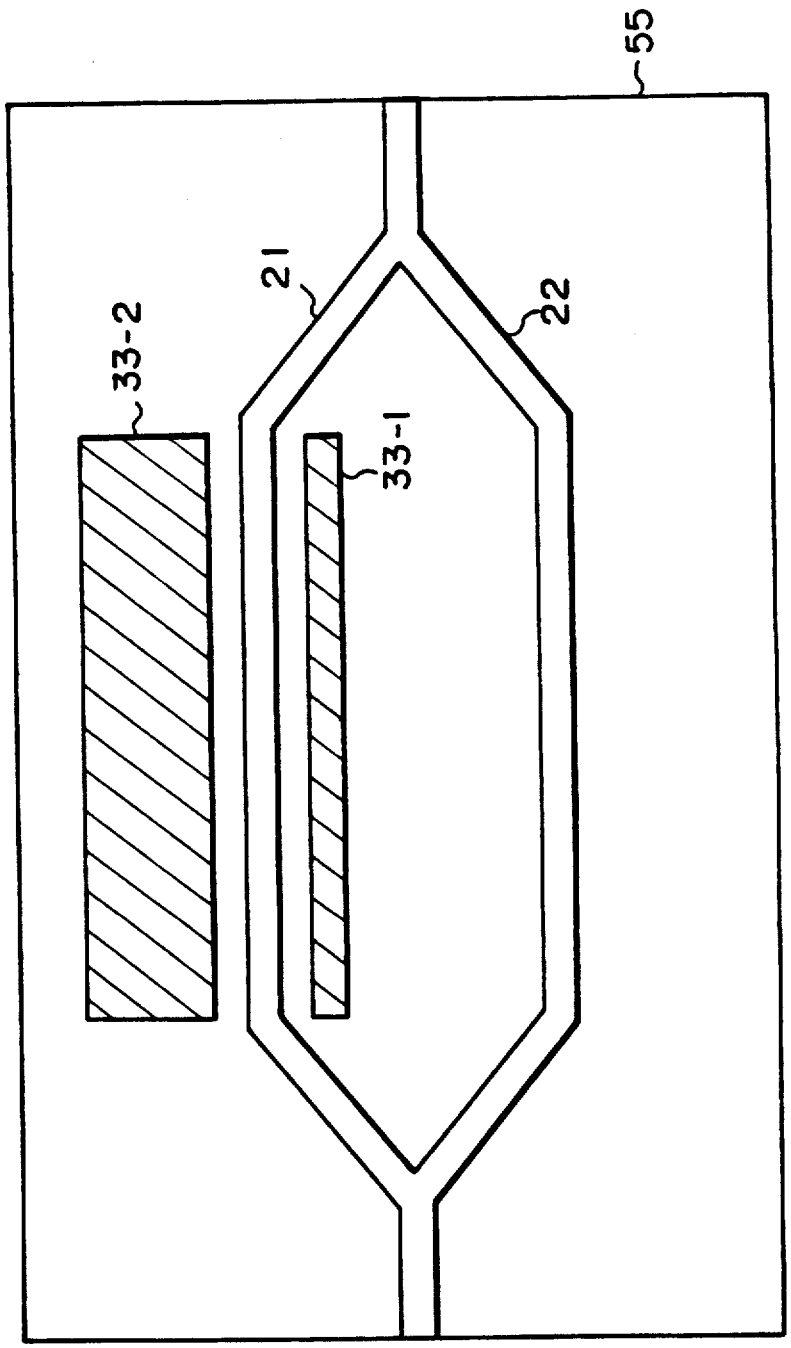
FIG. 26 is a plane view of a ninth embodiment of the present invention.

FIG. 25 is a plane view of an eighth embodiment of the present invention. FIG. 26 is a plane view of a ninth embodiment of the present invention.

These embodiments are constituted so that the phases of the light propagated in the first and second optical waveguides 21 and 22 become asymmetric by making the second driving voltage $DV_2$ always zero volt or making the second separated electrode 34 substantially not present.

In the eighth embodiment, the first and second optical waveguides 21 and 22 are formed in a substrate 55 made of a Z-cut electrooptic effect crystal, and the driving voltage side electrode 33-1 of the first pair of separated electrodes 33 is formed overlapping the first optical waveguide.

In the ninth embodiment, the first and second optical waveguides 21 and 22 are formed in a substrate 55 made of an X-cut electrooptic effect crystal, and the driving voltage side electrode 33-1 of the first pair of separated electrodes 33 is formed apart from the first optical waveguide 21.

Figure 27:
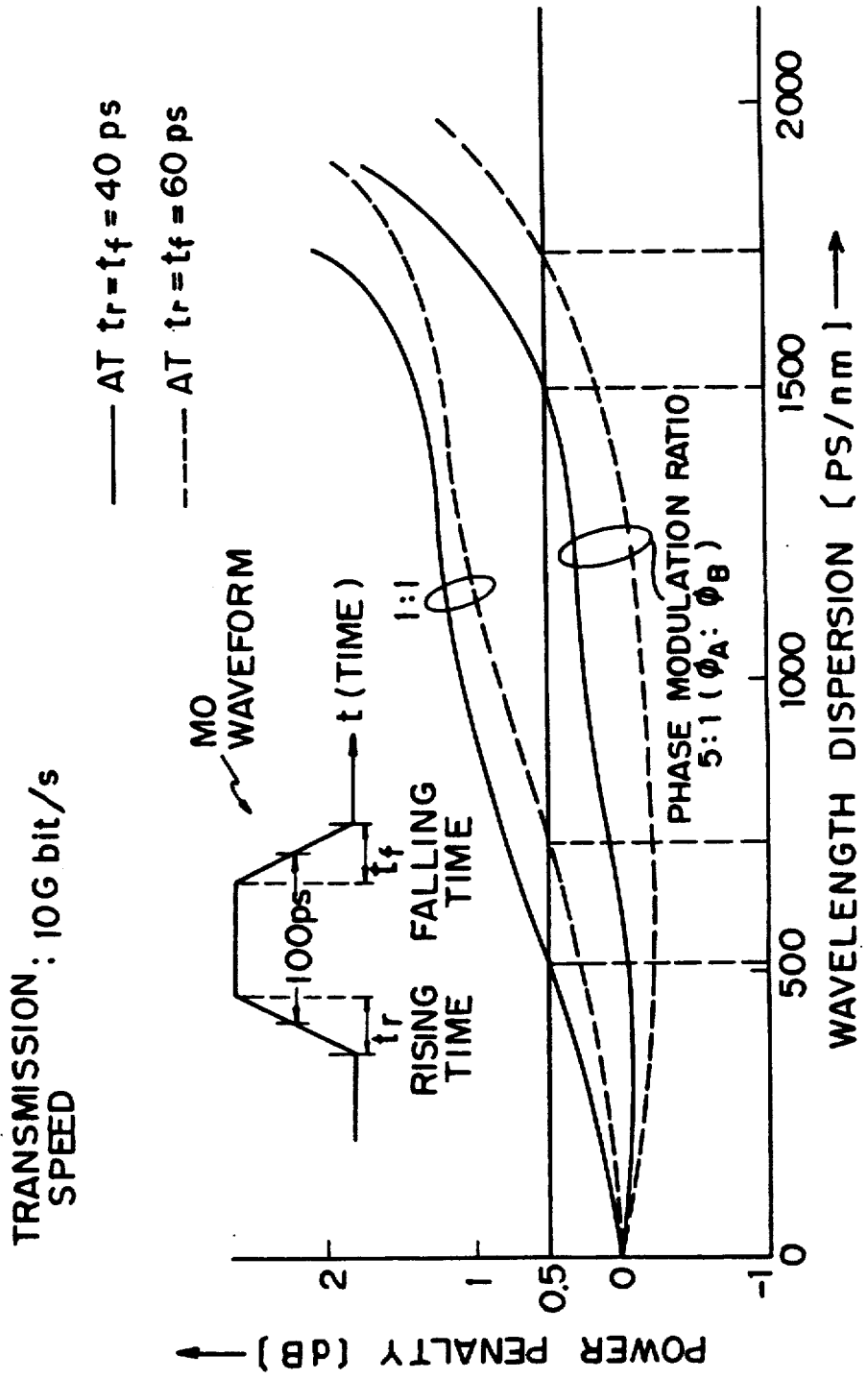
FIG. 27 is a graph of the results of a first calculation for explaining the improvement in the transmission characteristics of optical fibers according to the present invention.

FIG. 27 is a graph of the results of a first calculation for explaining the improvement in the transmission characteristics of optical fibers according to the present invention; and FIG. 28 is a graph of the results of a second calculation for explaining the improvement in the transmission characteristics of optical fibers according to the present invention.

FIG. 27 shows the results of calculation of the deterioration in the minimum received light power caused by the wavelength dispersion, i.e., the power penalty. When the allowance for the power penalty caused by optical fiber transmission is 0.5 dB, the allowable wavelength dispersion in the conventional modulation method is 500 to 700 ps/nm, while when the phase modulation ratio $\phi_A:\phi_B$ is made 5:1, it is improved to 1500 ps/nm or more. Further, FIG. 28 shows the results of similar calculation by another phase modulation ratio. From this it is learned that the phase modulation ratio should be 2:1 or more.

In the above explanation, use was made of the example of the case of operation under conditions where the wavelength dispersion value changes only in the positive region (with the object of reducing the transmission loss). Therefore, the center wavelength at the rising edge of the modulated light is shifted to the long wavelength side and the center wavelength at the falling edge of the modulated light is shifted to the short wavelength side.

However, in another system using optical fibers having other characteristics, there is a case of operation under the conditions where the wavelength dispersion value is close to zero and also a small transmission loss is given. An optical modulator cooperating with such an optical fiber must operate not only under conditions where the wavelength dispersion is in the positive region, but also under conditions where the wavelength dispersion is in the negative region.

In another system using optical fibers having other characteristics as mentioned above, there are cases of operation under the conditions where a wavelength dispersion is close to zero and also a small transmission loss is given. An optical modulator cooperating with such an optical fiber must operate not only under conditions where the wavelength dispersion is in the positive region, but also under conditions where the wavelength dispersion is in the negative region.

This being the case, when the wavelength dispersion is negative, the conditions of the previously mentioned wavelength shift must be set to enable setting opposite to the aforementioned case. That is, the center wavelength at the rising edge of the modulated light is to be shifted to the short wavelength side and the center wavelength at the falling edge of the modulated to be light is to be shifted to the long wavelength side.

As explained above, according to the present invention, it is possible to halve the driving voltage compared with the past and to easily make the circuit of the driving signal source by an IC. Further, since use is made of symmetric coupled lines, it is possible to eliminate the offset of the driving voltage in the prior art and the effects of temperature fluctuations and it is possible to receive a light signal in the receiving system without waveform deterioration. Further, as understood from the results of calculations of FIG. 27 and FIG. 28, according to the present invention, the optical fiber transmission characteristics are improved over the conventional modulation system, greatly contributing to improvement of the performance of high speed optical communication apparatuses.

What we claim is:

1. An optical modulator comprising, fundamentally,
   a Mach-Zehnder interferometer type modulator, which is constructed by a first optical waveguide and a second optical waveguide;
   a first electrode and a second electrode cooperating with the first optical waveguide and the second optical waveguide; and
   driving means for relatively changing the phases of the light in the first and second optical waveguides in accordance with a data input,
   the driving means comprising a first driving unit and a second driving unit which independently drive the first electrode and the second electrode,
   the first and second driving units applying a first driving voltage and a second driving voltage determined independently, to the first and second electrodes,
   the first electrode and the second electrode being respectively comprised of a first line electrode and a second line electrode forming a mutually symmetric coupled line and
   the first driving unit and the second driving unit applying mutually differential first and second driving voltages to the first and second line electrodes.

2. An optical modulator as set forth in claim 1, wherein the first and second line electrodes are comprised of stripline electrodes formed on and along the first and second optical waveguides.

3. An optical modulator as set forth in claim 1, wherein a DC bias voltage is applied to the first or second line electrode.

4. An optical modulator as set forth in claim 1, wherein provision is made of a 3 dB optical coupler which receives as input the optical outputs from the first optical waveguide and the second optical waveguide and sends out two mutually differential modulated lights from optical output ends of the 3 dB optical coupler.

5. An optical modulator as set forth in claim 4, wherein provision is made of a first output side optical fiber and a second output side optical fiber which take out the two modulated lights and the modulated light from the first or the second optical fiber is used as a monitoring signal.

6. An optical modulator as set forth in claim 1, wherein the first and second driving units are comprised of a single driving unit.

7. An optical modulator as set forth in claim 6, wherein the single driving unit is comprised of a differential transistor pair consisting of a first transistor and a second transistor receiving in common at their bases a data input and a constant current source for said differential transistor pair, output ends of the first and second transistors being connected to one ends of the first and second line electrodes, respectively, the other ends of the line electrodes being connected to terminating resistors.

8. An optical modulator as set forth in claim 7, wherein the output voltages of the first transistor and the second transistor are in the range of from about $-2.5$ V to about $-4$ V.

9. An optical modulator comprising, fundamentally,
   a Mach-Zehnder interferometer type modulator, which is constructed by a first optical waveguide and a second optical waveguide;
   a first electrode and a second electrode cooperating with the first optical waveguide and second optical waveguide; and
   driving means for relatively changing the phases of the light in the first and second optical waveguides in accordance with a data input,
   the driving means comprising a first driving unit and a second driving unit which independently drive the first electrode and the second electrode,
   the first and second driving units applying a first driving voltage and a second driving voltage determined independently, to the first and second electrodes,
   the first and second driving voltages being used to make the mutual phases of the lights propagating through the first and second optical waveguides asymmetric, the center wavelength at the rising edge of the modulated light from the optical modulator being shifted to the long wavelength side and the center frequency at the falling edge of the modulated light being shifted to the short wavelength side.

10. An optical modulator as set forth in claim 9, wherein the first and second electrodes are comprised of first and second pairs of separated electrodes separated along the first and second optical waveguides and one electrode of each of the pair of separated electrodes receiving at one end the corresponding driving voltage and being connected at another end to one end of the other separated electrode through a terminating resistor, the other end of the other separated electrode being grounded.

11. An optical modulator as set forth in claim 10, wherein the first and second pairs of separated electrodes have the same length and
   the first and second pairs of separated electrodes receiving respectively first and second driving voltages having mutually different voltage levels.

12. An optical modulator as set forth in claim 11, wherein the first and second optical waveguides are both formed in a substrate made of a Z-cut electrooptic effect crystal and over the first and second optical waveguides are overlappingly formed driving voltage side electrodes of the first and second pairs of separated electrodes.

13. An optical modulator as set forth in claim 11, wherein the first and second optical waveguides are formed in a substrate consisting of X- or Y-cut electrooptic effect crystal and away from the first and second optical waveguides are formed driving voltage side electrodes of the first and second pairs of separated electrodes.

14. An optical modulator as set forth in claim 10, wherein the first and second pairs of separated electrodes have differing lengths and
the first and second pairs of separated electrodes receiving respectively first and second driving voltages having mutually the same voltage levels.

15. An optical modulator as set forth in claim 14, wherein the first and second optical waveguides are both formed in a substrate made of a Z-cut electrooptic effect crystal and over the first and second optical waveguides are overlappingly formed driving voltage side electrodes of the first and second pairs of separated electrodes.

16. An optical modulator as set forth in claim 14, wherein the first and second optical waveguides are both formed in a substrate made of an X- or Y-cut electrooptic effect crystal and away from the first and second optical waveguides are formed driving voltage side electrodes of the first and second pairs of separated electrodes.

17. An optical modulator as set forth in claim 10, wherein the positional relationship, when seen from a sectional view, of the first pair of separated electrodes to the first optical waveguide and the positional relationship, when seen from a sectional view, of the second pair of separated electrodes to the second optical waveguide are asymmetrical.

18. An optical modulator as set forth in claim 17, wherein the first and second optical waveguides are both formed in a substrate made of a Z-cut electrooptic effect crystal and over the first and second optical waveguides are overlappingly formed driving voltage side electrodes of the first and second pairs of separated electrodes.

19. An optical modulator as set forth in claim 17, wherein the first and second optical waveguides are both formed in a substrate made of an X- or Y-cut electrooptic effect crystal and away from the first and second optical waveguides are formed driving voltage side electrodes of the first and second pairs of separated electrodes.

20. An optical modulator as set forth in claim 10, wherein the phases of the lights propagated in the first and second optical waveguides become asymmetric by making the second driving voltage always zero volt or making the second pair of the separated electrodes substantially not present.

21. An optical modulator as set forth in claim 20, wherein the first and second optical waveguides are both formed in a substrate made of a Z-cut electrooptic effect crystal and over the first and second optical waveguides are overlappingly formed driving voltage side electrodes of the first and second pairs of separated electrodes.

22. An optical modulator as set forth in claim 20, wherein the first and second optical waveguides are both formed in a substrate made of an X- or Y-cut electrooptic effect crystal and away from the first and second optical waveguides are formed driving voltage side electrodes of the first and second pairs of separated electrodes.

23. An optical modulator as set forth in claim 9, wherein
the first electrode is comprised of a pair of separated electrodes separated along the first optical waveguide;
the second electrode is formed along the second optical waveguide but away from the same and is grounded;
one of the pair of separated electrodes forming the first electrode receives at one end a corresponding driving voltage and is connected at the other end to one end of the other separated electrode through a terminating resistor, the other end of the other separated electrode being grounded; and
the separated electrode of the driving voltage side, when viewed sectionally, is placed at an asymmetric position with respect to the first and second optical waveguides, and the first and second optical waveguides are formed in a substrate constituted by an X- or Y-cut electrooptic effect crystal.

* * * * *